(12) United States Patent
Park et al.

(10) Patent No.: US 12,347,393 B2
(45) Date of Patent: Jul. 1, 2025

(54) DISPLAY DEVICE AND DRIVING METHOD

(71) Applicant: LG DISPLAY CO., LTD., Seoul (KR)

(72) Inventors: YongKyu Park, Seoul (KR); JaeKook Ahn, Busan (KR)

(73) Assignee: LG Display Co., Ltd. (KR)

( * ) Notice: Subject to any disclaimer, the term of this patent is extended or adjusted under 35 U.S.C. 154(b) by 0 days.

(21) Appl. No.: 18/421,387

(22) Filed: Jan. 24, 2024

(65) Prior Publication Data

US 2024/0290287 A1 Aug. 29, 2024

(30) Foreign Application Priority Data

Feb. 28, 2023 (KR) .................. 10-2023-0026816

(51) Int. Cl.
*G09G 3/3291* (2016.01)
*G09G 3/32* (2016.01)
*H02M 3/158* (2006.01)

(52) U.S. Cl.
CPC ............. *G09G 3/3291* (2013.01); *G09G 3/32* (2013.01); *G09G 2310/027* (2013.01); *G09G 2310/0275* (2013.01); *G09G 2310/061* (2013.01); *H02M 3/1582* (2013.01)

(58) Field of Classification Search
CPC .. G09G 3/3291; G09G 3/32; G09G 2310/027; G09G 2310/0275; G09G 2310/061; H02M 3/1582
See application file for complete search history.

(56) References Cited

U.S. PATENT DOCUMENTS

| | | | |
|---|---|---|---|
| 6,618,031 B1* | 9/2003 | Bohn, Jr. | G09G 3/20 |
| | | | 345/82 |
| 2009/0303219 A1* | 12/2009 | Kimura | G09G 3/3607 |
| | | | 345/90 |
| 2020/0019270 A1* | 1/2020 | Shin | G06F 1/3262 |

\* cited by examiner

*Primary Examiner* — Robert J Michaud
(74) *Attorney, Agent, or Firm* — Fish & Richardson P.C.

(57) ABSTRACT

A display device and a method of driving the same are disclosed, and more specifically, the display device includes a source voltage generation circuit, and enabling the source voltage generation circuit to receive a variable source voltage control signal from a controller and supply a variable source voltage corresponding to the variable source voltage control signal, and a method of driving the display device.

18 Claims, 22 Drawing Sheets

DISPLAY DEVICE AND DRIVING METHOD

CROSS-REFERENCE TO RELATED APPLICATION

This application claims the priority of Korean Patent Application No. 10-2023-0026816, filed on Feb. 28, 2023, which is hereby incorporated by reference in its entirety.

BACKGROUND

Field of the Disclosure

The present disclosure generally relates to electronic devices including display, and more specifically, to a display device and a method of driving the display device.

Description of the Background

As the information-oriented society has been developed, various needs for display devices for displaying images have increased. Recently, various types of display devices, such as liquid crystal display (LCD) devices, organic light emitting diode (OLED) display devices, and the like have been developed and widely used.

A display device may include a display panel in which a plurality of data lines, a plurality of gate lines, and a plurality of subpixels are disposed, a data driving circuit for supplying data signals through the plurality of data lines, a gate driving circuit for supplying scan signals through the plurality of gate lines, and the like.

A source driving voltage may be supplied to the data driving circuit.

SUMMARY

Typical display devices have been suffered from wasted power consumption as a source driving voltage with a constant voltage level is supplied to the data driving circuit.

To address this issue, one or more aspects of the present disclosure may provide a display device capable of allowing a source driving voltage with variable voltage levels to be supplied to a data driving circuit, and a method of driving the display device.

One or more aspects of the present disclosure may provide a display device capable of being driven at low power, and a method of driving the display device.

According to aspects of the present disclosure, a display device may be provided that includes a display panel in which a plurality of subpixels are disposed, a data driving circuit configured to supply a data voltage to the display panel, a controller for controlling the data driving circuit, and a power supply for supplying a variable source voltage generated based on an input voltage to the data driving circuit. The power supply may include a source voltage generation circuit, and the source voltage generation circuit may be configured to receive a variable source voltage control signal from the controller and output the variable source voltage corresponding to the variable source voltage control signal.

According to aspects of the present disclosure, a method of driving a display device may be provided that includes: with a controller controlling a data driving circuit, supplying a variable source voltage control signal to a source voltage generation circuit included in a power supply; with the source voltage generation circuit, outputting a variable source voltage corresponding to the variable source voltage control signal to the data driving circuit; with data driving circuit, supplying a data voltage using the variable source voltage to a display panel.

According to one or more aspects of the present disclosure, a display device may be provided that is capable of allowing a source driving voltage with variable voltage levels to be supplied to a data driving circuit, and a method of driving the display device may be provided.

According to one or more aspects of the present disclosure, a display device may be provided that is capable of being driven at low power, and a method of driving the display device may be provided.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain principles of the disclosure.

In the drawings:

FIG. 10 illustrates example source voltages controlled during active periods and blank periods in the display device according to aspects of the present disclosure;

DETAILED DESCRIPTION

Figure 1:
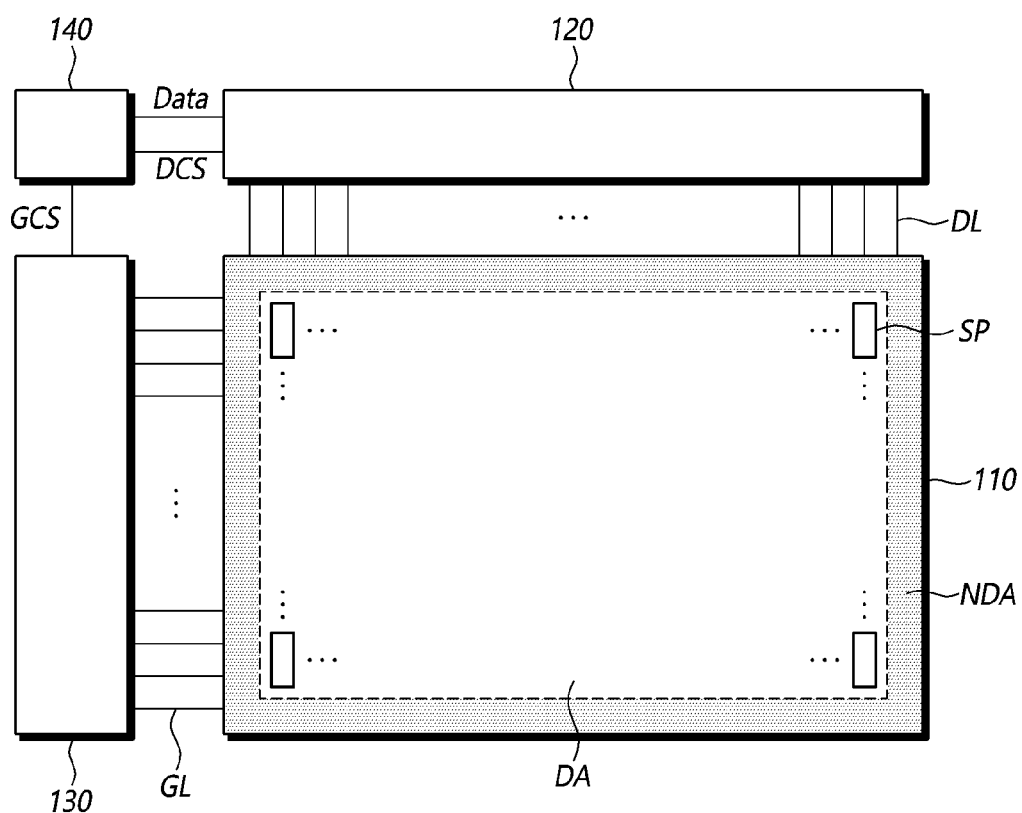
FIG. 1 illustrates an example system configuration of a display device according to aspects of the present disclosure.

Reference will now be made in detail to aspects of the present disclosure, examples of which may be illustrated in the accompanying drawings.

In the following description, the structures, aspects, implementations, methods and operations described herein are not limited to the specific example or examples set forth herein and may be changed as is known in the art, unless otherwise specified. Like reference numerals designate like elements throughout, unless otherwise specified. Names of the respective elements used in the following explanations are selected only for convenience of writing the specification and may thus be different from those used in actual products. Advantages and features of the present disclosure, and implementation methods thereof will be clarified through following example aspects described with reference to the accompanying drawings. The present disclosure may, however, be embodied in different forms and should not be construed as limited to the example aspects set forth herein. Rather, these example aspects are provided so that this disclosure may be sufficiently thorough and complete to assist those skilled in the art to fully understand the scope of the present disclosure. Further, the protected scope of the present disclosure is defined by claims and their equivalents. In the following description, where the detailed description of the relevant known function or configuration may unnecessarily obscure aspects of the present disclosure, a detailed description of such known function or configuration may be omitted. The shapes, sizes, ratios, angles, numbers, and the like, which are illustrated in the drawings to describe various example aspects of the present disclosure, are merely given by way of example. Therefore, the present disclosure is not limited to the illustrations in the drawings. Where the terms "comprise," "have," "include," "contain," "constitute," "make up of," "formed of," and the like are used, one or more other elements may be added unless the term, such as "only," is used. An element described in the singular form is intended to include a plurality of elements, and vice versa, unless the context clearly indicates otherwise.

Although the terms "first," "second," A, B, (a), (b), and the like may be used herein to describe various elements, these elements should not be interpreted to be limited by these terms as they are not used to define a particular order or precedence. These terms are used only to distinguish one element from another. For example, a first element could be termed a second element, and, similarly, a second element could be termed a first element, without departing from the scope of the present disclosure.

When it is mentioned that a first element "is connected or coupled to", "contacts or overlaps" etc. a second element, it should be interpreted that, not only may the first element "be directly connected or coupled to" or "directly contact or overlap" the second element, but a third element may also be "interposed" between the first and second elements, or the first and second elements may "be connected or coupled to", "contact or overlap", etc. each other via a fourth element. Here, the second element may be included in at least one of two or more elements that "are connected or coupled to", "contact or overlap," etc. each other.

Where positional relationships are described, for example, where the positional relationship between two parts is described using "on," "over," "under," "above," "below," "beside," "next," or the like, one or more other parts may be located between the two parts unless a more limiting term, such as "immediate(lee)," "direct(ly)," or "close(ly)" is used. For example, where an element or layer is disposed "on" another element or layer, a third element or layer may be interposed therebetween. Furthermore, the terms "left," "right," "top," "bottom, "downward," "upward," "upper," "lower," and the like refer to an arbitrary frame of reference.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompass all the meanings of the term "can".

Hereinafter, with reference to the accompanying drawings, various aspects of the present disclosure will be described in detail.

FIG. 1 illustrates an example system configuration of a display device 100 according to aspects of the present disclosure.

Referring to FIG. 1, the display device 100 may include a display panel 110 and at least one driving circuit for driving the display panel 110.

The display panel 110 may include signal lines such as a plurality of gate lines GL, a plurality of data lines DL, and the like, and include a plurality of subpixels SP connected to the plurality of gate lines GL and the plurality of data lines DL. The display panel 110 may include a display area DA in which an image is displayed and a non-display area NDA in which an image is not displayed. In the display panel 110, the plurality of subpixels SP may be disposed in the display area DA for displaying images, and the at least one driving circuit (120, 130, and/or 140) may be electrically connected to, or mounted in, the non-display area NDA. A pad portion in which an integrated circuit or a printed circuit is connected may be disposed in the non-display area NDA of the display panel 110.

The at least one driving circuit may include a data driving circuit 120, a gate driving circuit 130, and the like, and further include a controller 140 for controlling the data driving circuit 120 and the gate driving circuit 130.

The data driving circuit 120 may be a circuit for driving the plurality of data lines DL, and may supply data signals to the plurality of data lines DL. The gate driving circuit 130 may be a circuit for driving the plurality of gate lines GL, and may supply gate signals to the plurality of gate lines GL.

The gate driving circuit 130 may supply a gate signal of a turn-on level voltage or a gate signal of a turn-off level voltage according to the control of the controller 140. The gate driving circuit 130 may sequentially drive a plurality of gate lines GL by sequentially supplying gate signals of the turn-on level voltage to the plurality of gate lines GL.

The controller 140 may supply a data control signal DCS to the data driving circuit 120 to control an operation timing of the data driving circuit 120. The controller 140 may supply a gate control signal GCS to the gate driving circuit 130 to control an operation timing of the gate driving circuit 130.

The controller 140 may start to scan pixels according to respective timings set in each frame, convert image data inputted from external devices or external image providing sources (e.g. host systems) in a data signal form readable by the data driving circuit 120 and then supply image data Data resulting from the converting to the data driving circuit 120, and according to the scan process, control the loading of the data to at least one pixel at a time at which the illumination of at least one corresponding light emitting element of the at least one pixel is intended.

To control the data driving circuit 120 and the gate driving circuit 130, the controller 140 may receive timing signals such as a vertical synchronization signal VSYNC, a horizontal synchronization signal HSYNC, an input data enable signal DE, a clock signal CLK, and the like, generate several types of control signals (DCS, GCS, and/or the like), and output the generated signals to the data driving circuit 120 and the gate driving circuit 130.

The controller 140 may be implemented in a separate component from the data driving circuit 120, or integrated with the data driving circuit 120 and thus implemented in a single integrated circuit.

The data driving circuit 120 may drive a plurality of data lines DL by supplying data voltages corresponding to image data Data received from the controller 140 to the plurality of data lines DL. The data driving circuit 120 may also be referred to as a source driving circuit. The data driving circuit 120 may include, for example, one or more source driver integrated circuits SDIC. Each source driver integrated circuit SDIC may include a shift register, a latch circuit, a digital-to-analog converter DAC, an output buffer, and the like. In one or more aspects, each source driver integrated circuit SDIC may further include an analog-to-digital converter ADC.

The shift register may sequentially output latch pulses to a plurality of latches included in a latch circuit.

The latch circuit may sequentially store input data in response to the latch pulses.

The digital-to-analog converter DAC may convert the input data output from the latch circuit into an analog voltage.

The output buffer may be a buffer circuit including an operational amplifier AMP_D. For example, the output buffer BUF may be an operational amplifier circuit functioning as a unit gain buffer with a gain of 1.

In one or more aspects, each source driving circuit SDIC may be connected to the display panel 110 using a tape-automated-bonding (TAB) technique, or connected to a conductive pad such as a bonding pad of the display panel 110 using a chip-on-glass (COG) technique or a chip-on-panel (COP) technique, or connected to the display panel 110 using a chip-on-film (COF) technique.

In one or more aspects, the gate driving circuit 130 may be connected to the display panel 110 using the tape-automated-bonding (TAB) technique, or connected to a conductive pad such as a bonding pad of the display panel 110 using the chip-on-glass (COG) technique or the chip-on-panel (COP) technique, or connected to the display panel 110 using the chip-on-film (COF) technique. In one or more aspects, the gate driving circuit 130 may be formed in the non-display area NDA of the display panel 110 using a gate-in-panel (GIP) technique.

When a specific gate line is selected and driven by the gate driving circuit 130, the data driving circuit 120 may convert image data Data received from the controller 140 into data voltages in an analog form and supply the data voltages resulting from the converting to a plurality of data lines DL.

The data driving circuit 120 may be located in, and/or electrically connected to, but not limited to, only one side or portion (e.g., an upper edge or a lower edge) of the display panel 110. In one or more aspects, the data driving circuit 120 may be located in, and/or electrically connected to, but not limited to, two sides or portions (e.g., an upper edge and a lower edge) of the display panel 110 or at least two of four sides or portions (e.g., the upper edge, the lower edge, a left edge, and a right edge) of the display panel 110 according to driving schemes, panel design schemes, or the like.

The gate driving circuit 130 may be located in, and/or electrically connected to, but not limited to, only one side or portion (e.g., a left edge or a right edge) of the display panel 110. In one or more aspects, the gate driving circuit 130 may be located in, and/or electrically connected to, but not limited to, two sides or portions (e.g., a left edge and a right edge) of the panel 110 or at least two of four sides or portions (e.g., an upper edge, a lower edge, the left edge, and the right edge) of the panel 110 according to driving schemes, panel design schemes, or the like.

The controller 140 may be a timing controller 140 used in the typical display technology or a control apparatus/device capable of additionally performing other control functionalities in addition to the typical function of the timing controller. In one or more aspects, the controller 140 may be one or more other control circuits different from the timing controller 140, or a circuit or component in the control apparatus/device The controller 140 may be implemented using various circuits or electronic components such as an integrated circuit (IC), a field programmable gate array (FPGA), an application specific integrated circuit (ASIC), a processor, and/or the like.

The controller 140 may be mounted on a printed circuit board, a flexible printed circuit, or the like, and may be electrically connected to the data driving circuit 120 and the gate driving circuit 130 through the printed circuit board, the flexible printed circuit, or the like. The controller 140 may transmit signals to, and receive signals from, the data driving circuit 120 via one or more predetermined interfaces. For example, such interfaces may include a low voltage differential signaling (LVDS) interface, an embedded clock point-point interface (EPI), a serial peripheral interface (SPI), and the like. The controller 140 may include a storage medium or one or more storage locations such as one or more registers.

In one or more aspects, the display device 100 may be a self-emissive display such as an organic light emitting diode (OLED) display, a quantum dot (QD) display, a micro light emitting diode (M-LED) display, and the like with, or without, a backlight unit.

Figure 2:
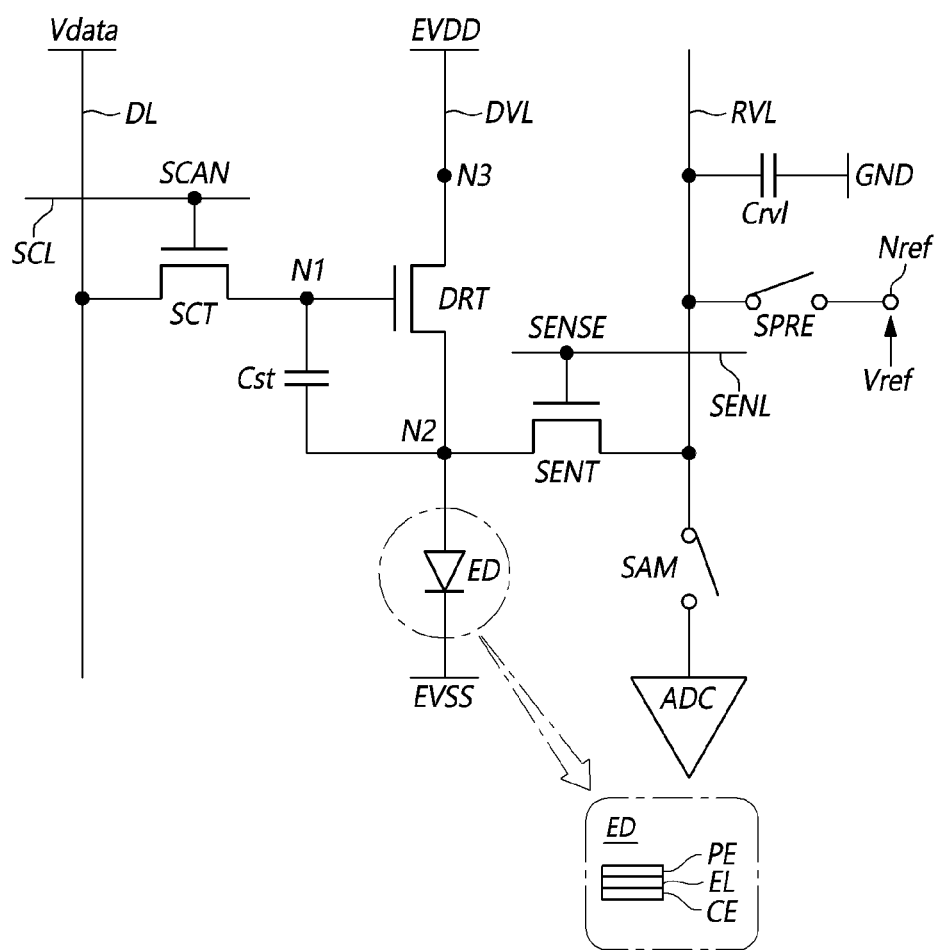
FIG. 2 is an example equivalent circuit of a subpixel included in the display device according to aspects of the present disclosure.

FIG. 2 illustrates an example equivalent circuit of a subpixel SP included in the display device 100 according to aspects of the present disclosure.

Referring to FIG. 2, in one or more aspects, each of a plurality of subpixels SP disposed in the display panel 110 of the display device 100 according to aspects of the present disclosure may include a light emitting element ED, a driving transistor DRT, a scan transistor SCT, a sensing transistor SENT, a storage capacitor Cst, and the like. Such a circuit structure in which one subpixel SP is configured with three transistors (3T: DRT, SCT and SENT) and one capacitor (1C: Cst) may be referred to as a "3T1C structure".

The light emitting element ED may include, for example, a pixel electrode PE, a common electrode CE, and an emission layer EL located between the pixel electrode PE and the common electrode CE. In this example, the pixel electrode PE may be disposed in each subpixel SP, and the common electrode CE may be commonly disposed in all, or two or more, of the plurality of subpixels SP. For example, the pixel electrode PE may be an anode electrode, and the common electrode CE may be a cathode electrode. In another example, the pixel electrode PE may be a cathode electrode, and the common electrode CE may be an anode electrode. In one or more aspects, the light emitting element ED may be an organic light emitting diode (OLED), a light emitting element configured with quantum dots, a micro light emitting diode (µ-LED), a light emitting diode (LED) based on inorganic material, or the like. As light emitting elements ED emit light, the display device 100 may present an image of a frame based at least in part on corresponding image data Data.

The driving transistor DRT may be a transistor for driving the light emitting element ED, and include a first node N1, a second node N2, and a third node N3.

The first node N1 of the driving transistor DRT may be the gate node of the driving transistor DRT, and may be electrically connected to the source node or drain node of the scan transistor SCT. The second node N2 of the driving transistor DRT may be a source node or a drain node of the driving transistor DRT. The second node N2 may be also electrically connected to the source node or drain node of a sensing transistor SENT, and connected to the pixel electrode PE of the light emitting element ED. The third node N3 of the driving transistor DRT may be electrically connected to a driving voltage line DVL for carrying a driving voltage EVDD. The driving transistor DRT may be electrically connected between the driving voltage line DVL and the light emitting element ED.

The scan transistor SCT may be controlled by a scan signal SCAN, and may be connected between the first node N1 of the driving transistor DRT and a data line DL. The scan transistor SCT may be turned on or turned off by the scan signal SCAN carried through a scan signal line SCL, which is a type of the gate line GL, and control an electrical connection between the data line DL and the first node N1 of the driving transistor DRT.

The scan transistor SCT may be turned on by the scan signal SCAN having a turn-on level voltage, and pass a data voltage Vdata carried through the data line DL to the first node N1 of the driving transistor DRT.

The turn-on level voltage of the scan signal SCAN for turning on the scan transistor SCT may be a high level voltage or a low level voltage. A turn-off level voltage of the scan signal SCAN for turning off the scan transistor SCT may be a low level voltage or a high level voltage. In an example where the scan transistor SCT is an n-type transistor, the turn-on level voltage may be a high level voltage, and the turn-off level voltage may be a low level voltage. In another example where the scan transistor SCT is a p-type transistor, the turn-on level voltage may be a low level voltage, and the turn-off level voltage may be a high level voltage.

The sensing transistor SENT may be controlled by a sensing signal SENSE and may be connected between the second node N2 of the driving transistor DRT and a reference voltage line RVL. The sensing transistor SENT may be turned on or turned off by the sensing signal SENSE carried through a sensing signal line SENL, which is another type of the gate line GL, and control an electrical connection between the second node N2 of the driving transistor DRT and the reference voltage line RVL.

The sensing transistor SENT may be turned on by the sensing signal SENSE having a turn-on level voltage, and pass a reference voltage Vref carried through the reference voltage line RVL to the second node N2 of the driving transistor DRT.

The turn-on level voltage of the sensing signal SENSE for turning on the sensing transistor SENT may be a high level voltage or a low level voltage. A turn-off level voltage of the sensing signal SENSE for turning off the sensing transistor SENT may be a low level voltage or a high level voltage. In an example where the sensing transistor SENT is an n-type transistor, the turn-on level voltage may be a high level voltage, and the turn-off level voltage may be a low level voltage. In another example where the sensing transistor SENT is a p-type transistor, the turn-on level voltage may be a low level voltage, and the turn-off level voltage may be a high level voltage.

In one or more aspects, the display device 100 may further include a line capacitor Crv1 formed between the reference voltage line RVL and the ground GND, a sampling switch SAM for controlling a connection between the reference voltage line RVL and an analog-to-digital converter ADC, and a power switch SPRE for controlling a connection between the reference voltage line RVL and a reference voltage supply node Nref. The reference voltage Vref output from the power supply 500 may be supplied to the reference voltage supply node Nref, and then, applied to the reference voltage line RVL through the power switch SPRE.

Further, the sensing transistor SENT may be turned on by the sensing signal SENSE having the turn-on level voltage, and pass a voltage V2 of the second node N2 of the driving transistor DRT to the reference voltage line RVL. Thereby, the line capacitor Crv1 formed between the reference voltage line RVL and the ground GND may charge.

For example, the function of the sensing transistor SENT that passes the voltage V2 of the second node N2 of the driving transistor DRT to the reference voltage line RVL may be used when the subpixel SP is driven to sense one or more characteristic values of the subpixel SP. In this example, the voltage passed to the reference voltage line RVL may be a voltage to determine a characteristic value of the subpixel SP or a voltage where the characteristic value of the subpixel SP is reflected.

Herein, the characteristic value of the subpixel SP may be a characteristic value of the driving transistor DRT or the light emitting element ED. The characteristic value of the driving transistor DRT may include a threshold voltage and/or mobility of the driving transistor DRT. The characteristic value of the light emitting element ED may include a threshold voltage of the light emitting element ED.

Each of the driving transistor DRT, the scan transistor SCT, and the sensing transistor SENT may be an n-type transistor, or a p-type transistor. Herein, for convenience of description, discussions are provided based on an example where each of the driving transistor DRT, the scan transistor SCT, and the sensing transistor SENT is an n-type transistor.

The storage capacitor Cst may be connected between the first node N1 and the second node N2 of the driving transistor DRT. The storage capacitor Cst may store an amount of electric charge corresponding to a voltage difference between both terminals and maintain the voltage difference between both terminals for a predetermined frame time. As a result, the corresponding subpixel SP may emit light for the predetermined frame time.

The storage capacitor Cst may be an external capacitor intentionally designed to be located outside of the driving transistor DRT, other than an internal capacitor, such as a parasitic capacitor (e.g., a Cgs or a Cgd), that may be formed between the gate node and the source node (or the drain node) of the driving transistor DRT.

In an aspect, the scan signal line SCL and the sense signal line SENL may be different gate lines GL. In this aspect, the scan signal SCAN and the sensing signal SENSE may be separate gate signals, and respective turn-on and/or turn-off timings of the scan transistor SCT and the sensing transistor SENT in one subpixel SP may be independent of each other. For example, turn-on and/or turn-off timings of the scan transistor SCT and turn-on and/or turn-off timings of the sensing transistor SENT in one subpixel SP may be the same as, or different from, each other according to design requirements.

In another aspect, the scan signal line SCL and the sensing signal line SENL may be the same gate line GL. For example, the gate node of the scan transistor SCT and the gate node of the sensing transistor SENT in one subpixel SP may be connected to one gate line GL. In this aspect, the scan signal SCAN and the sensing signal SENSE may be the same gate signal, and respective turn-on and/or turn-off timings of the scan transistor SCT and the sensing transistor SENT in one subpixel SP may be the same.

In an aspect, the reference voltage line RVL may be disposed in each column of subpixels SP. In another aspect, the reference voltage line RVL may be disposed in every two or more columns of subpixels SP. In the aspect where the reference voltage line RVL is disposed in every two or more columns of subpixels SP, a plurality of subpixels SP may receive a reference voltage Vref through one reference voltage line RVL.

Figure 3:
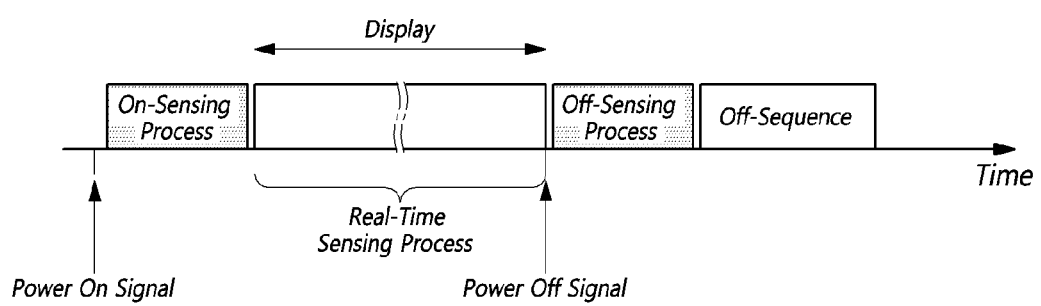
FIG. 3 illustrates example sensing timings configured for sensing in the touch display device according to aspects of the present disclosure.
Figure 4:
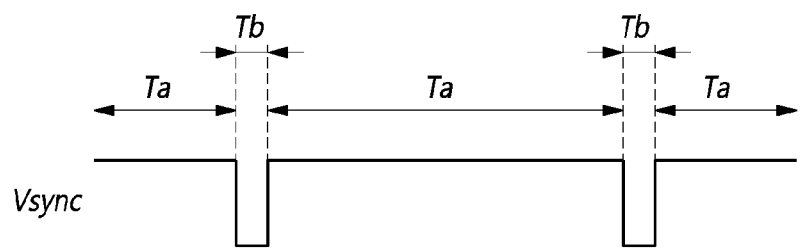
FIG. 4 illustrates an example vertical synchronous signal defined in the touch display device according to aspects of the present disclosure.

FIG. 3 illustrates example sensing timings configured for sensing in the touch display device 100 according to aspects of the present disclosure. FIG. 4 illustrates an example vertical synchronous signal defined in the touch display device 100 according to aspects of the present disclosure.

Referring to FIG. 3, in an aspect, when a power-on signal is generated, the display device 100 according to aspects of the present disclosure may sense respective characteristic values of corresponding driving transistors of all or one or more of a plurality subpixels SP disposed in the display panel 110. This sensing process may be referred to as "on-sensing process."

In another aspect, when a power-off signal is generated, before an off-sequence such as switch-off of power proceeds, the display device 100 may also sense respective characteristic values of corresponding driving transistors of all or one or more of the plurality subpixels SP disposed in the display panel 110. This sensing process may be referred to as "off-sensing process."

In further another aspect, while display driving is being performed after the power-on signal is generated and before the power-off signal is generated, the display device 100 may also sense respective characteristic values of corresponding driving transistors of all or one or more of the plurality subpixels SP. This sensing process may be referred to as "real-time sensing process."

Referring to FIG. 4, a vertical synchronization signal Vsync serving as a control signal for defining a frame may repeatedly include a signal period defining an active period Ta and a signal period defining a blank period Tb for successive frames. The active period Ta may be a period in which substantial display driving for updating an image is performed, and the blank period Tb may be a suspend period in which substantial display driving for updating an image is not performed.

For example, the signal period defining the active period Ta may be a high level voltage period, and the signal period defining the blank period Tb may be a low level voltage period. In another example, the signal period defining the active period Ta may be a low level voltage period, and the signal period defining the blank period Tb may be a high level voltage period.

Referring to FIG. 4, one image driving period may include one active period Ta and one blank period Tb. That is, one active period Ta, which is a period during which one entire frame of image among a plurality of frames of images is updated through the display panel 110, and one blank period Tb, which is a period different from the active period Ta, may be included in one image driving period.

The real-time sensing process described above may be performed every blank period Tb between active periods Ta based on the vertical synchronization signal Vsync.

Figure 5:
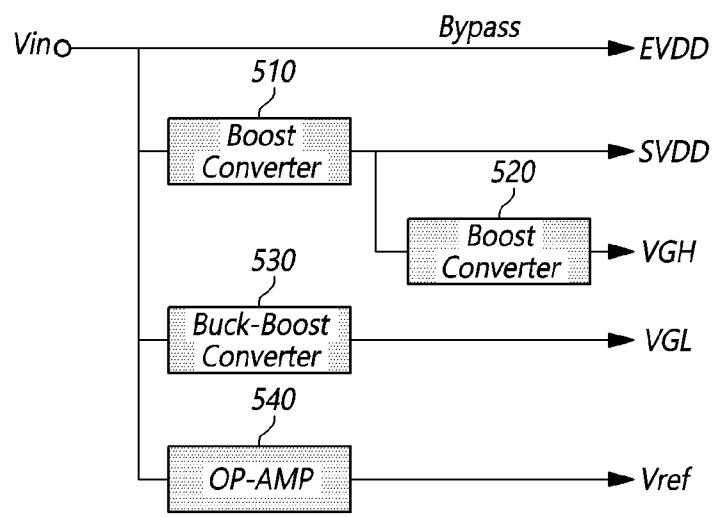
FIG. 5 illustrates an example power supply included in the touch display device according to aspects of the present disclosure.

FIG. 5 illustrates an example power supply 500 included in the touch display device 100 according to aspects of the present disclosure.

The power supply 500 may receive an input voltage Vin and then supply a voltage based on the input voltage Vin. For example, referring to FIG. 5, a voltage supplied by the power supply 500 may include a driving voltage EVDD (e.g., the driving voltage EVDD of FIG. 3), a source voltage SVDD, a gate high voltage VGH, a gate low voltage VGL, and a reference voltage Vref (e.g., the reference voltage Vref of FIG. 3), and the like.

The driving voltage EVDD may be supplied to the third node N3 to which the driving transistor DRT is electrically connected. The source voltage SVDD may be supplied to an output buffer included in the data driving circuit 120. The gate high voltage VGH and the gate low voltage VGL may be supplied to the gate node of the scan transistor SCT. The reference voltage Vref may be supplied to the second node N2 to which the driving transistor DRT is electrically connected.

The power supply 500 may include circuits or circuit elements for adjusting the input voltage Vin (e.g., adjusting a value or level of the input voltage Vin). For example, referring to FIG. 5, the power supply 500 may include one or more boost converters (510 and/or 520), a buck-boost converter 530, and an operational amplifier 540.

The one or more boost converters (510 and/or 520), which are a type of DC-DC converter, may supply one or more voltages resulting from stepping up the input voltage Vin.

The buck-boost converter 530, which is a type of DC-DC converter, may supply one or more voltages resulting from stepping down or stepping up the input voltage Vin. The buck-boost converter 530 may be a non-inverting buck-boost converter 530. For example, the buck-boost converter 530 may output a voltage having a positive value. The buck-boost converter 530 discussed below may have the characteristics of the non-inverting buck-boost converter.

The operational amplifier 540 may be configured as a non-inverting amplifier circuit or an inverting amplifier, and may output a voltage resulting from adjusting the input voltage Vin (e.g., adjusting the value or level of the input voltage Vin).

The power supply 500 may supply the driving voltage EVDD based on the input voltage Vin. The input voltage Vin may be bypassed, and thereby, the driving voltage EVDD may be the same value (or level) as the input voltage Vin.

The power supply 500 may supply the source voltage SVDD based on the input voltage Vin. The input voltage Vin may be supplied to a first boost converter 510, and then, the first boost converter 510 may supply the source voltage SVDD resulting from adjusting the input voltage Vin.

The power supply 500 may supply the gate high voltage VGH based on the input voltage Vin. The input voltage Vin may be supplied to the first boost converter 510, and then, a voltage (e.g., the source voltage SVDD, the input voltage Vin passed by the first boost converter 510, or a voltage different from the source voltage SVDD and the input voltage Vin) output from the first boost converter 510 may be supplied to a second boost converter 520. The second boost converter 520 may supply the gate high voltage VGH resulting from adjusting the voltage output from the first boost converter 510.

The power supply 500 may supply the gate low voltage VGL based on the input voltage Vin. The input voltage Vin may be supplied to the buck-boost converter 530, and then, the buck-boost converter 530 may supply the gate low voltage VGL resulting from adjusting the input voltage Vin.

The power supply 500 may supply the reference voltage Vref based on the input voltage Vin. The input voltage Vin may be supplied to the operational amplifier 540, and then the operational amplifier 540 may supply the reference voltage Vref resulting from adjusting the input voltage Vin.

Figure 6:
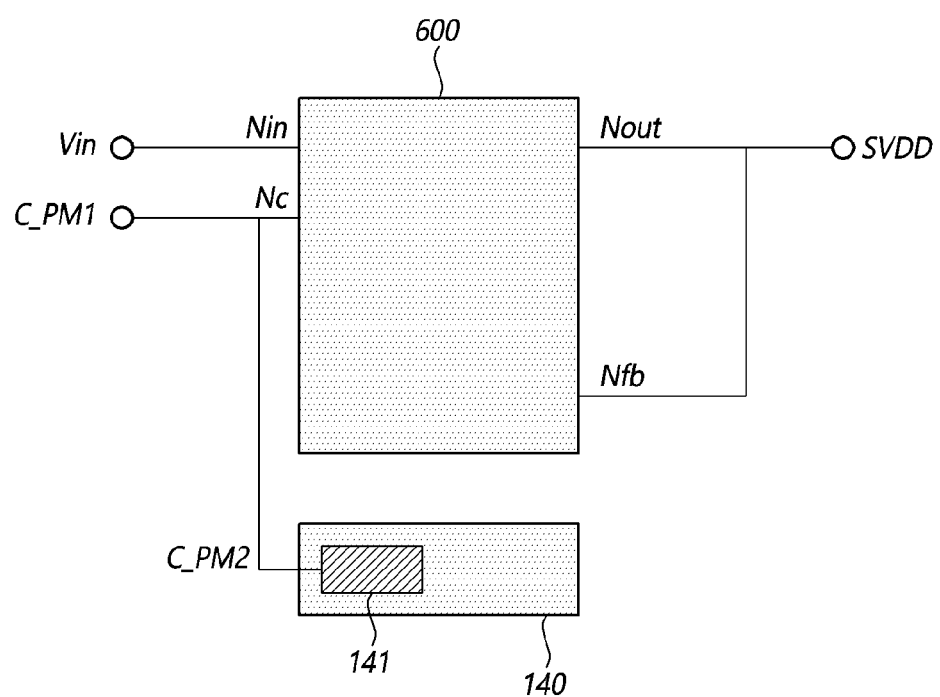
FIG. 6 illustrates an example source voltage generation circuit and source voltage control circuit included in the touch display device according to aspects of the present disclosure.

FIG. 6 illustrates an example source voltage generation circuit 600 and an example source voltage control circuit 141 included in the display device 100 according to aspects of the present disclosure.

The source voltage generation circuit 600 may receive an input voltage Vin through an input node Nin, and generate a source voltage SVDD based on the input voltage Vin.

For example, the source voltage SVDD may be greater than the input voltage Vin. That is, the source voltage SVDD may have a greater voltage value (or voltage level) than the input voltage Vin. In another example, the source voltage SVDD may be less than or equal to the input voltage Vin. That is, the source voltage SVDD may have a voltage value (or voltage level) less than or equal to the input voltage Vin.

The source voltage generation circuit 600 may include a voltage controller (not shown). The voltage controller may receive a normal source voltage control signal C_PM1 through a control node Nc. The normal source voltage control signal C_PM1 may contain data on a source voltage SVDD to be generated and supplied by the source voltage generation circuit 600.

The normal source voltage control signal C_PM1 may be supplied to a non-volatile memory included in the voltage controller. The non-volatile memory may store the normal source voltage control signal C_PM1. For example, the non-volatile memory may be an electrically erasable and programmable read-only memory (EEPROM).

Thereafter, the normal source voltage control signal C_PM1 stored in the non-volatile memory may be supplied to a volatile memory. In an aspect, the non-volatile memory may be located in the voltage controller or in source voltage generation circuit 600 as a separate component from the voltage controller. The normal source voltage control signal C_PM1 supplied to the volatile memory may be provided to a digital-to-analog converter DAC. In an aspect, the digital-to-analog converter DAC may be located in the voltage controller or in the source voltage generation circuit 600 as a separate component from the voltage controller. For example, the volatile memory may be a register.

The digital-to-analog converter DAC may convert the received normal source voltage control signal C_PM1 into a normal source voltage control signal C_PM1 in the form of analog voltage, and output the normal source voltage control signal in the form of analog voltage. The normal source voltage control signal C_PM1 in the form of analog voltage may be supplied to the gate node of a control transistor. In an aspect, the control transistor may be located in the voltage controller or in the source voltage generation circuit 600 as a separate component from the voltage controller. The control transistor may control the source voltage SVDD (e.g., control the value or level of the source voltage SVDD).

The value or level of the source voltage SVDD may be controlled depending on the value or level of a voltage (e.g., the normal source voltage control signal C_PM1 in the form of analog voltage) supplied to the gate node of the control transistor, That is, the source voltage generation circuit 600 may receive the input voltage Vin and output the source voltage SVDD corresponding to the normal source voltage control signal C_PM1 through an output node Nout.

The source voltage generation circuit 600 may receive the source voltage SVDD through a feedback node Nfb. The receiving of the source voltage SVDD by the source voltage generation circuit 600 may be referred to as "feedback" of the source voltage SVDD. Since the source voltage SVDD is fed back to the source voltage generation circuit 600, the source voltage generation circuit 600 may determine whether the source voltage SVDD corresponding to the normal source voltage control signal C_PM1 is normally output. When it is determined that the source voltage SVDD being output does not correspond to the normal source voltage control signal C_PM1, the source voltage generation circuit 600 may control the source voltage SVDD such that the source voltage SVDD being output may be corresponded to the normal source voltage control signal C_PM1.

For example, the source voltage control circuit 141 may cause a value or level of the source voltage SVDD to be adjusted.

In an aspect, the source voltage control circuit 141 may be included in the controller 140. In another aspect, the source voltage control circuit 141 may be located outside of the controller 140 as a separate component.

The source voltage control circuit 141 may be electrically connected to the control node Nc. The source voltage control circuit 141 may supply a variable source voltage control signal C_PM2 to the control node Nc.

The variable source voltage control signal C_PM2 may contain data for a variable source voltage SVDD_adap to be generated and supplied by the source voltage generation circuit 600. When compared to the fixed source voltage SVDD, the variable source voltage SVDD_adap may mean a source voltage SVDD whose value (or level) may be changed according to the variable source voltage control signal C_PM2. The variable source voltage control signal C_PM2 may be supplied to the voltage controller through the control node Nc.

In an aspect, the variable source voltage control signal C_PM2 may be supplied to a non-volatile memory included in the voltage controller. For example, the non-volatile memory storing the normal source voltage control signal C_PM1 and the non-volatile memory storing the variable source voltage control signal C_PM2 may be the same as, or different from, each other. Thereafter, the variable source voltage control signal C_PM2 stored in the non-volatile memory may be supplied to a volatile memory. For example, the volatile memory used for the normal source voltage control signal C_PM1 and the volatile memory used for the variable source voltage control signal C_PM2 may be the same as, or different from, each other. In another aspect, the variable source voltage control signal C_PM2 may be directly supplied to the volatile memory.

That is, the variable source voltage control signal C_PM2 may be stored in advance in the non-volatile memory, and/or the variable source voltage control signal C_PM2 may be supplied to the volatile memory when needed.

Hereinafter, a method of controlling the variable source voltage SVDD_adap using the variable source voltage control signal C_PM2 will be described with reference to accompanying drawings.

Figure 7:
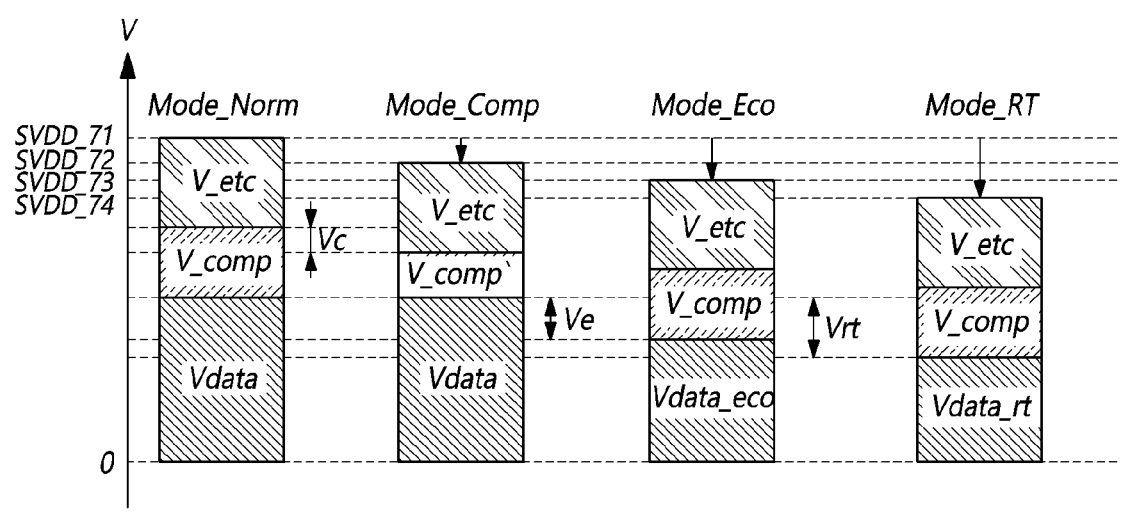
FIG. 7 illustrates an example method of setting a source voltage in the display device according to aspects of the present disclosure.
Figure 8:
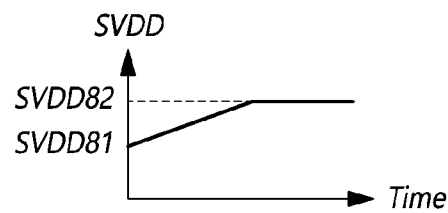
FIG. 8 illustrates an example compensation mode defined in the display device according to aspects of the present disclosure.
Figure 9:
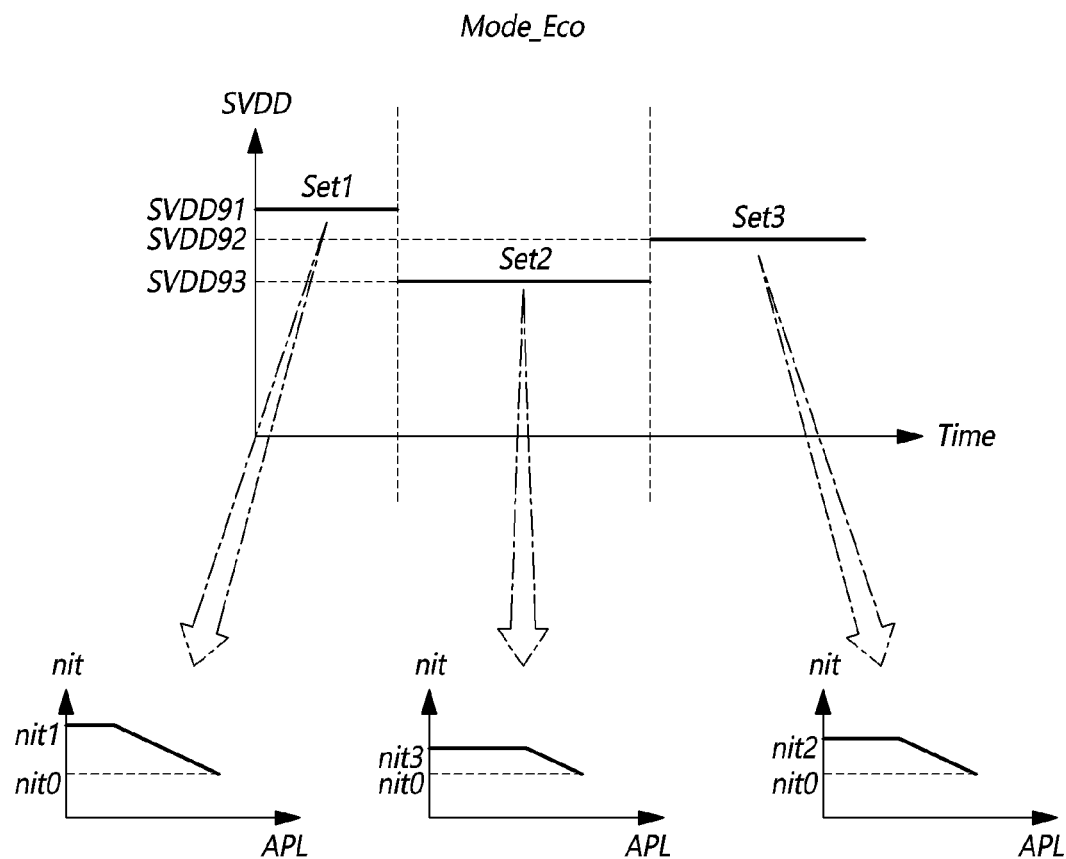
FIG. 9 illustrates an example eco mode defined in the touch display device according to aspects of the present disclosure.
Figure 10:
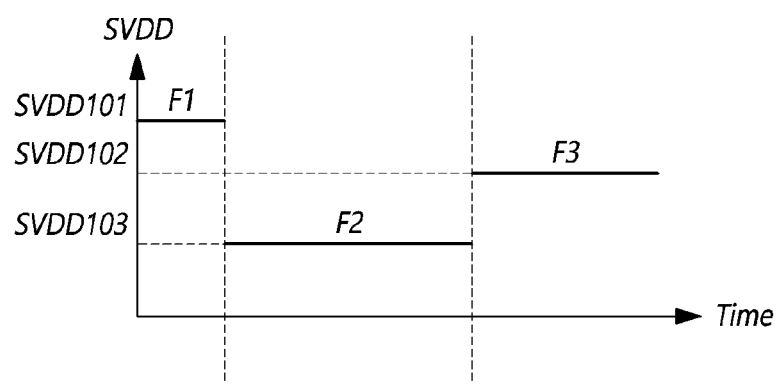
FIG. 10 illustrates an example real-time mode defined in the display device according to aspects of the present disclosure.

FIG. 7 illustrates an example method of setting a source voltage SVDD in the display device 100 according to aspects of the present disclosure. FIG. 8 illustrates an example compensation mode defined in the display device 100 according to aspects of the present disclosure. FIG. 9 illustrates an example eco mode defined in the touch display device 100 according to aspects of the present disclosure. FIG. 10 illustrates an example real-time mode defined in the display device 100 according to aspects of the present disclosure.

Referring to FIG. 7, a source voltage SVDD may include a data voltage Vdata, a compensation voltage V_comp, and at least one other voltage V_etc that may be used in the display device 100.

The data voltage Vdata may be a voltage for controlling the luminance of a corresponding light emitting element ED.

The data voltage Vdata may be a voltage supplied to the gate node of a corresponding driving transistor DRT. The amount of a driving current Id flowing through the driving transistor DRT may be controlled depending on a value or level of the data voltage Vdata. The luminance of the light emitting element ED may be determined depending on the amount of the driving current Id. That is, the luminance of the light emitting element ED may be determined depending on the value or level of the data voltage Vdata.

A data voltage Vdata may be adjusted in a predetermined range to control the luminance of a corresponding light emitting element ED. For example, a data voltage Vdata for causing a corresponding light emitting element ED to represent low luminance may have a relatively low voltage value (or voltage level), and a data voltage Vdata for causing the light emitting element ED to represent high luminance may have a relatively high voltage value (or voltage level). In another example, depending on design requirements for subpixels SP, a data voltage Vdata for causing a corresponding light emitting element ED to represent low luminance may have a relatively high voltage value (or voltage level), and a data voltage Vdata for causing the light emitting element ED to represent high luminance may have a relatively low voltage value (or voltage level).

The compensation voltage V_comp may be a voltage for compensating for a shift in a characteristic value of a corresponding subpixel SP or a difference between respective characteristic values of subpixels.

Respective characteristic values of driving transistors DRT may be different from each other. A difference between the characteristic values of driving transistors DRT may cause non-uniformity in the luminance of the display panel 110. In addition, respective characteristic values of light emitting elements ED may be different from each other. A difference between the characteristic values of driving transistors DRT or light emitting elements ED may cause non-uniformity in the luminance of the display panel 110. Such a difference in characteristic values may be caused by manufacturing variations such as a margin of error or a process variation in the process of forming driving transistors DRT or light emitting elements ED, or may be caused by driving variations such as the aging of driving transistors DRT or light emitting elements ED over time. In this situation, to compensate for such a difference in characteristic values, a data voltage Vdata may be compensated based on a corresponding compensation voltage V_comp. Thus, uniformity in the luminance of the display panel 110 may be improved using such a corresponding compensation voltage V_comp.

A compensation voltage V_comp may be adjusted in a predetermined range to compensate for a difference between respective characteristic values of subpixels SP. As a difference between respective characteristic values is greater, a corresponding compensation voltage V_comp may have a relatively high voltage value (or voltage level), and as the difference is smaller, the compensation voltage (V_comp) may have a relatively low voltage value (or voltage level).

The compensation voltage (V_comp) may include an initial compensation voltage and a real-time compensation voltage. The initial compensation voltage may be a voltage used to compensate for differences in characteristic values of circuit elements before the display device 100 is driven. The real-time compensation voltage may be a voltage used to compensate for differences in characteristic values of circuit elements while the display device 100 is being driven.

The at least one other voltage V_etc may be a voltage for stably controlling the source voltage SVDD. The at least one other voltage V_etc may include a margin voltage. When the at least one other voltage V_etc is set to a voltage for being used as an additional source voltage SVDD, the at least one other voltage V_etc may be used as a data voltage Vdata and/or a compensation voltage V_comp.

Referring to FIG. 7, the source voltage SVDD may have different values or levels depending on a mode in which the value or level of the source voltage SVDD is set.

The mode in which the value or level of the source voltage SVDD is set may include a normal mode Mode_Norm, a compensation mode Mode_Comp, an eco mode Mode_Eco, and a real-time mode Mode_RT. A source voltage SVDD output in the normal mode Mode_Norm may be a constant source voltage. Source voltages SVDD output in the compensation mode Mode_Comp, the eco mode Mode_Eco, and the real-time mode Mode_RT may be variable source voltages SVDD_adap. Referring to FIGS. 7 to 10, a second source voltage SVDD_72, a third source voltage SVDD_73, and a fourth source voltage SVDD_74 may be supplied to an output buffer in the compensation mode Mode_Comp, the eco mode Mode_Eco, and the real-time mode Mode_RT, respectively. It should be noted that the second source voltage SVDD_72, the third source voltage SVDD_73, and the fourth source voltage SVDD_74 are merely example values for convenience of explanation. That is, the second source voltage SVDD_72, the third source voltage SVDD_73, and the fourth source voltage SVDD_74 may be voltages included in a variable source voltage SVDD_adap (e.g., the variable source voltage SVDD_adap discussed above with reference to FIG. 6).

In the case of the normal mode Mode_Norm, the source voltage SVDD may have a first source voltage SVDD_71, which is a voltage value obtained by adding the data voltage Vdata, the compensation voltage V_comp, and the at least one other voltage V_etc. The source voltage SVDD in the normal mode Mode_Norm may be referred to as the first source voltage SVDD_71. The first source voltage SVDD_71 may represent a constant source voltage whose voltage value or level is constant.

In the case of the normal mode Mode_Norm, while the first source voltage SVDD_71 may be supplied to the output buffer, a voltage in actual used by the output buffer may be less than the first source voltage SVDD_71. For example, a voltage less than the maximum voltage value of a data voltage Vdata may be used as the data voltage Vdata, and a voltage less than the maximum voltage value of a compensation voltage V_comp may be used as the compensation voltage V_comp. In this example, since the voltage in actual used by the output buffer may be less than the first source voltage SVDD_71, an unnecessarily high voltage may be supplied to the output buffer, and power consumption may be therefore wasted.

To address these issues, one or more aspects of the present disclosure may provide a source voltage control mode for reducing power consumption.

Referring to FIG. 7, in the case of the compensation mode Mode_Comp, the source voltage SVDD may have the second source voltage SVDD_72, which is a voltage value obtained by adding the data voltage Vdata, a control compensation voltage V_comp', and the at least one other voltage V_etc. The source voltage SVDD in the compensation mode Mode_Comp may be referred to as the second source voltage SVDD_72.

In the case of the compensation mode Mode_Comp, the voltage range (or voltage value or voltage level) of the compensation voltage V_comp in the normal mode Mode_Norm may be reduced, and for example, a control compensation voltage V_comp' corresponding to such a reduced compensation voltage V_comp may be used as a compensation voltage.

As a driving time of the display device 100 increases, a voltage required for compensation may increase. That is, a voltage required for compensation when the display device 100 is powered up may be less than a voltage required for compensation when the display device 100 has been driven for a long time.

Referring to FIG. 8, since a voltage required for compensation when the display device 100 is powered up has a relatively low voltage value (or voltage level), a required source voltage SVDD may be set to a second first source voltage SVDD81. As a time during which the display device 100 is driven increases, a value or level of voltage required for compensation increases, and therefore, a required source voltage SVDD may be set to a second second source voltage SVDD81, which is increased from the second first source voltage SVDD81 by a predetermined value or level. In this implementation, the second first source voltage SVDD81 may correspond to the second source voltage SVDD_72, and the second second source voltage SVDD82 may correspond to the first source voltage SVDD_71.

In the case of the compensation mode Mode_Comp, the control compensation voltage V_comp' may be less than the compensation voltage V_comp by a first difference voltage Vc.

In the case of the compensation mode Mode_Comp, since the second source voltage SVDD_72, which is less than the first source voltage SVDD_71 by the first difference voltage Vc, is supplied to the output buffer, power consumption may be therefore reduced.

Referring to FIG. 7, in the case of the eco mode Mode_Eco, the source voltage SVDD may have the third source voltage SVDD_73, which is a voltage value obtained by adding an echo data voltage Vdata_eco, the compensation voltage V_comp, and the at least one other voltage V_etc. The source voltage SVDD in the eco mode Mode_Eco may be referred to as the third source voltage SVDD_73.

In the case of the eco mode Mode_Eco, the voltage range (or voltage value or voltage level) of the data voltage Vdata in the normal mode Mode_Norm may be reduced, and for example, an echo data voltage Vdata_eco corresponding to such a reduced data voltage Vdata may be used as a compensation voltage.

The display device 100 may be configured with a nit band set based on the luminance of the display panel 110. For example, when the maximum luminance of the display panel 110 is 1000 nits, the display panel 110 set to a 500 nit band may express grayscale with 500 nits as the maximum luminance. Further, the display panel 110 set to a 200 nit band may express grayscale with 200 nits as the maximum luminance. Thus, the display panel 110 set to an x nit band may express grayscale with the x nit as the maximum luminance.

In the case of the normal mode Mode_Norm, even when the display panel 110 is driven with a relatively low nit band, a source voltage SVDD configured to output the maximum luminance of the highest nit band may be set. Since a data voltage corresponding to the maximum luminance of a relatively low nit band has a relatively low data voltage value (or data voltage level), in the case of the eco mode Mode_Eco, the data voltage Vdata in the normal mode Mode_Norm may be reduced, and an eco data voltage Vdata_eco corresponding to such a reduced data voltage Vdata may be used.

Referring to FIG. 7, the echo data voltage Vdata_eco used in the eco mode Mode_Eco may be less than the data voltage Vdata in the normal mode Mode_Norm by a second difference voltage Ve. In the case of the eco mode Mode_Eco, the third source voltage SVDD_73, which is less than the first source voltage SVDD_71 by the second difference voltage Ve, is supplied to the output buffer, thereby reducing power consumption.

FIG. 9 illustrates a graph of source voltage SVDD versus time for a first setting Set1, a second setting Set2, and a third setting Set3. For convenience of explanation, it is assumed that the first setting Set1, the second setting Set2, and the third setting Set3 are driven in this sequential order over time. FIG. 9 further illustrates peak luminance control (PLC) corresponding to the first setting Set1, the second setting Set2, and the third setting Set3.

The graph for PLC (Peak Lminance Control) is shown where the horizontal axis is APL (%) and the vertical axis is peak luminance (nit). APL (average peak luminance) refers to the average luminance of image data output from a display panel and is determined according to the image data. For example, if there are many black pixels in a frame of video data, the APL is low, and if there are few black pixels, the APL is high. Since an organic light emitting display device has a limited amount of allowable current, the peak luminance is set low for image data with a high APL, and the peak luminance is set high for image data with a low APL. Peak luminance refers to the maximum luminance value output in response to the maximum input gray level.

The first setting Set1 may be configured with a nit band whose maximum nit value is a first nit nit1. In the case of the first setting Set1, a third first source voltage SVDD91 corresponding to the first nit nit1 may be supplied to the output buffer.

The second setting Set2 may be configured with a nit band whose maximum nit value is a third nit nit3. In the case of the second setting Set2, a third third source voltage SVDD93 corresponding to the third nit nit3 may be supplied to the output buffer.

The third setting Set3 may be configured with a nit band whose maximum nit value is a second nit nit2. In the case of the third setting Set3, a third second source voltage SVDD92 corresponding to the second nit nit2 may be supplied to the output buffer.

A relationship between a zero nit nit0, the first nit nit1, the second nit nit2, and the 3rd nit nit3 in value or level may be "the first nit nit1>the second nit nit2>the third nit nit3>the zero nit nit0." A relationship between the third first source voltage SVDD91, the third second source voltage SVDD92, and the third third source voltage SVDD93 in value or level may be "the third first source voltage (SVDD91)>the third second source voltage (SVDD92)>the third third source voltage (SVDD93)."

That is, in the case of the eco mode Mode_Eco, since a source voltage (i.e., the SVDD91, SVDD92, or SVDD93) obtained by adjusting the source voltage SVDD based on the corresponding maximum nit value of each of the nit bands is supplied to the output buffer, power consumption may be therefore reduced Referring to FIG. 7, in the case of the real-time mode Mode_RT, the source voltage SVDD may have the fourth source voltage SVDD_74, which is a voltage value obtained by adding a real-time data voltage Vdata_rt, the compensation voltage V_comp, and the at least one other voltage V_etc. The source voltage SVDD in the real-time mode Mode_RT may be referred to as the fourth source voltage SVDD_74.

In the case of the real-time mode Mode_RT, the voltage range (or voltage value or voltage level) of the data voltage Vdata in the normal mode Mode_Norm may be reduced, and for example, a real-time data voltage Vdata_rt corresponding to such a reduced data voltage Vdata may be used as a compensation voltage.

The maximum luminance displayed through the display panel 110 may vary depending on an image frame. In the case of the real-time mode Mode_RT, power consumption may be reduced by using a real-time data voltage Vdata_rt corresponding to the maximum luminance expressed through the display panel 110. For example, it may be assumed that a data voltage supplied to a light emitting element ED driven at a relatively highest luminance among a plurality of light emitting elements ED for expressing an image frame is a real-time data voltage Vdata_rt. The real-time data voltage Vdata_rt may be less than the data voltage Vdata by a third difference voltage Vrt. In the case of the real-time data voltage Vdata_rt, the fourth source voltage SVDD_74, which is less than the first source voltage SVDD_71 by the third difference voltage Vrt, is supplied to the output buffer, thereby reducing power consumption.

Referring to FIG. 10, a first image frame F1, a second image frame F2, and a third image frame F3 may be displayed through the display panel 110 over time.

To express the first image frame F1, a first source voltage SVDD101 may be supplied to the output buffer. To express the second image frame F2, a third source voltage SVDD103 may be supplied to the output buffer. To express the third image frame F3, a second source voltage SVDD102 may be supplied to the output buffer.

A relationship between the first source voltage SVDD101, the second source voltage SVDD102, and the third source voltage SVDD103 in value or level may be "the first source voltage (SVDD101)>the second source voltage (SVDD102)>the third source voltage (SVDD103)."

That is, in the case of real-time mode Mode_RT, since a source voltage (i.e., the SVDD101, SVDD102, or SVDD103) corresponding to an image frame is supplied to the output buffer, power consumption may be therefore reduced.

Figure 11:
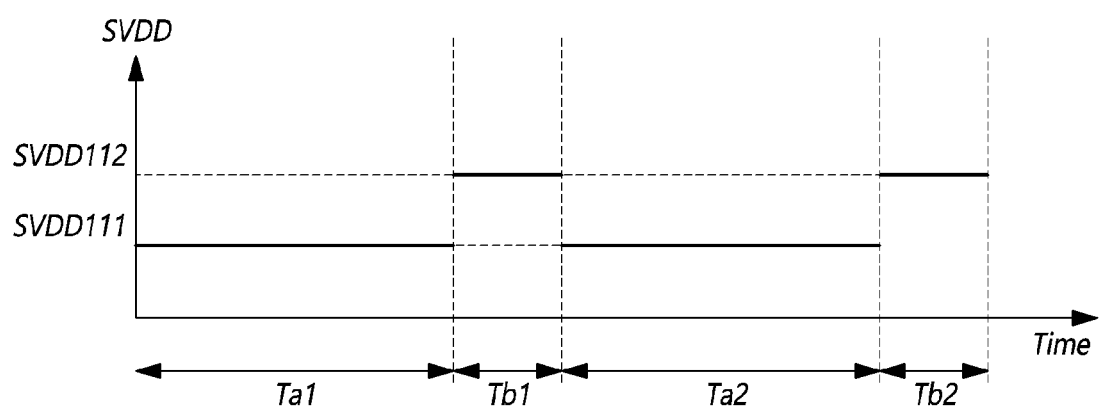

FIG. 11 illustrates example source voltages SVDD controlled during active periods Ta and blank periods Tb in the display device 100 according to aspects of the present disclosure.

A first image driving period may include a first active period Ta1 and a first blank period Tb1. A second image driving period may include a second active period Ta2 and a second blank period Tb2.

A fifth first source voltage SVDD111 may be supplied to the output buffer during the first active period Ta1. The fifth first source voltage SVDD111 may be a source voltage SVDD supplied in any one of the compensation mode Mode_Comp, the eco mode Mode_Eco, and the real-time mode Mode_RT.

A fifth second source voltage SVDD112 may be supplied during the first blank period Tb1. The fifth second source voltage SVDD112 may be greater than the fifth first source voltage SVDD111. The fifth second source voltage SVDD112 may be a voltage corresponding to the first source voltage SVDD_71 shown in FIG. 7.

A real-time sensing process may proceed in the blank period Tb. When the real-time sensing process proceeds, a voltage corresponding to the first source voltage SVDD_71 may be needed to be supplied to the output buffer depending on a condition under which the display device 100 is driven. In this situation, the fifth second source voltage SVDD112 corresponding to the first source voltage SVDD_71 may be supplied to the output buffer during the blank period Tb.

For example, the source voltage control circuit 141 may cause the fifth first source voltage SVDD111 to be supplied to the output buffer during at least one of the active periods (Ta1 and/or Ta2). Further, the source voltage control circuit 141 may cause the fifth second source voltage SVDD112 to be supplied to the output buffer during at least one of the blank periods (Tb1 and/or Tb2).

Figure 12:
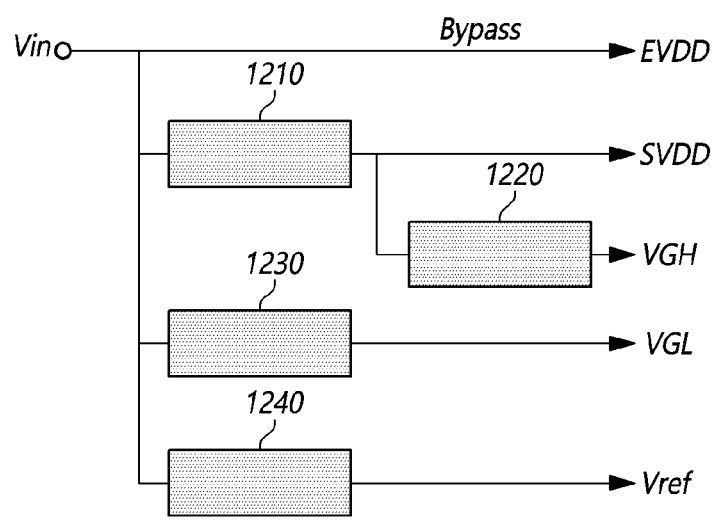
FIGS. 12, 13, and 14 illustrates example power supplies included in the display device according to aspects of the present disclosure.
Figure 13:
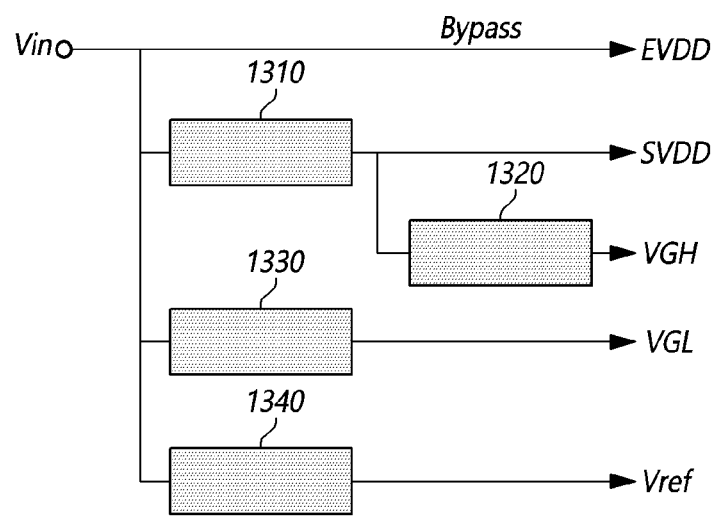
Figure 14:
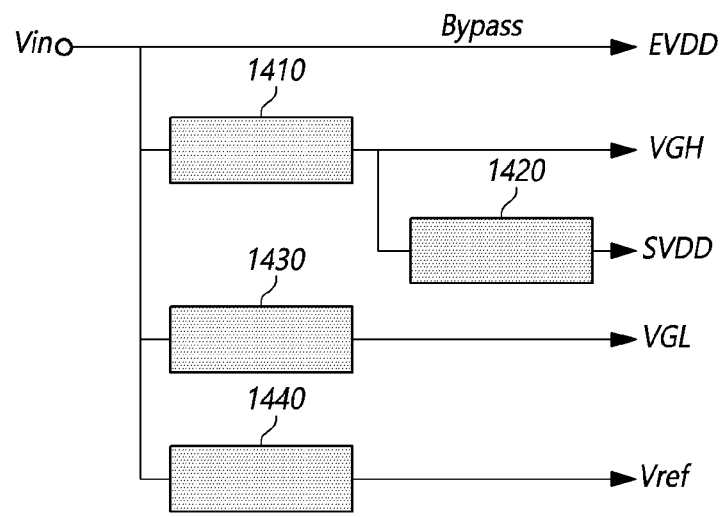

FIGS. 12, 13, and 14 illustrates example power supplies (1200, 1300, and 1400) included in the display device 100 according to aspects of the present disclosure.

Referring to FIG. 12, the power supply 1200 may receive an input voltage Vin and then supply a voltage based on the input voltage Vin. For example, referring to FIG. 12, a voltage supplied by the power supply 1200 may include a driving voltage EVDD, a source voltage SVDD, a gate high voltage VGH, a gate low voltage VGL, a reference voltage Vref, and the like. The power supply 1200 may include one or more boost converters (1210 and/or 1220), a buck-boost converter 1230, and an operational amplifier 1240.

The power supply 1200 shown in FIG. 12 may be the same as the power supply 500 shown in FIG. 5.

The power supply 1200 shown in FIG. 12 may supply the source voltage SVDD based on the input voltage Vin. The input voltage Vin may be supplied to a first boost converter 1210, and then the first boost converter 510 may supply the source voltage SVDD resulting from adjusting the input voltage Vin.

The first boost converter 1210 may be, for example, the source voltage generation circuit 600 shown in FIG. 6. The first boost converter 1210 may receive a normal source voltage control signal C_PM1 and a variable source voltage control signal C_PM2.

For example, when the first boost converter 1210 receives the normal source voltage control signal C_PM1, the first boost converter 1210 may output a source voltage SVDD, which is the first source voltage SVDD_71.

For example, when the first boost converter 1210 receives the variable source voltage control signal C_PM2, the first boost converter 1210 may output a source voltage SVDD having a value or level less than the first source voltage SVDD_71.

The first boost converter 1210 may include an inductor L electrically connected between an input node Nin and a shared node, a diode D electrically connected between the shared node and an output node Nout, and a control transistor electrically connected between the shared node and a base voltage node. The gate node of the control transistor may be electrically connected to a voltage controller. The voltage controller may be electrically connected to a control node Nc and a feedback node Nfb.

A first reference source voltage SVDD_ref1 may be greater than the input voltage Vin and less than the first source voltage SVDD_71.

As shown in FIG. 12, the power supply 1200 may generate a source voltage SVDD corresponding to the voltage range of the first reference source voltage SVDD_ref1 through the first boost converter 1210, and then supply the generated source voltage SVDD.

Referring to FIG. 13, the power supply device 1300 may receive an input voltage Vin and then supply a voltage based on the input voltage Vin. For example, referring to FIG. 13, a voltage supplied by the power supply 1300 may include a driving voltage EVDD, a source voltage SVDD, a gate high voltage VGH, a gate low voltage VGL, a reference voltage Vref, and the like. The power supply 1300 may include a single ended primary inductor converter 1310 (which may be referred to "SEPIC circuit"), a boost converter 1320, a buck-boost converter 1330, and an operational amplifier 1340.

When comparing FIGS. 12 and 13, there is a difference in that the first boost converter 1210 of FIG. 12 is replaced with the SEPIC circuit 1310.

The SEPIC circuit 1310 may output a voltage stepped down or stepped up based on the input voltage Vin. The voltage output from the SEPIC circuit 1310 may have a positive voltage value.

When comparing FIGS. 12 and 13, when the first boost converter 1210 of FIG. 12 is replaced with the SEPIC circuit 1310 of FIG. 13, the source voltage SVDD may be adjusted such that the source voltage SVDD has a value or level less than the input voltage Vin.

The SEPIC circuit 1310 may be, for example, the source voltage generation circuit 600 shown in FIG. 6. The SEPIC circuit 1310 may receive a normal source voltage control signal C_PM1 and a variable source voltage control signal C_PM2.

For example, when the SEPIC circuit 1310 receives the normal source voltage control signal C_PM1, the SEPIC circuit 1310 may output a source voltage SVDD, which is the first source voltage SVDD_71.

For example, when the SEPIC circuit 1310 receives the variable source voltage control signal C_PM2, the SEPIC circuit 1310 may output a source voltage SVDD having a value or level less than the first source voltage SVDD_71. The SEPIC circuit 1310 may supply a source voltage SVDD having a value or level less than the input voltage Vin.

The SEPIC circuit 1310 may include a first inductor electrically connected between an input node Nin and a first shared node, a control transistor electrically connected between the first shared node and a base voltage node, a capacitor electrically connected between the first shared node and the second shared node, a diode electrically connected between the second shared node and an output node Nout, and a second inductor electrically connected between the second shared node and the base voltage node. The gate node of the control transistor may be electrically connected to a voltage controller. The voltage controller may be electrically connected to a control node Nc and a feedback node Nfb.

It should be noted here that the SEPIC circuit 1310 may be a non-inverting buck-boost converter. In this implementation, the SEPIC circuit 1310 may include a first transistor electrically connected between the input node Nin and the first shared node, the first inductor electrically connected between the first shared node and the second shared node, a first diode electrically connected between the first shared node and the base voltage node, a second diode electrically connected between the second shared node and the output node Nout, a second transistor electrically connected between the second shared node and the base voltage node, and a capacitor electrically connected between the output node Nout and the base voltage node. The gate nodes of the first transistor and the second transistor may be electrically connected to the voltage controller. The voltage controller may be electrically connected to the control node Nc and the feedback node Nfb.

A second reference source voltage SVDD_ref2 may be a voltage having a value or level less than the first reference source voltage SVDD_ref1.

As shown in FIG. 13, the power supply 1200 may generate a source voltage SVDD corresponding to the voltage range of the second reference source voltage SVDD_ref2 through the SEPIC circuit 1310, and then supply the generated source voltage SVDD. The second reference source voltage SVDD_ref2 may be a voltage having a value or level less than the input voltage Vin.

Referring to FIG. 14, the power supply device 1400 may receive an input voltage Vin and then supply a voltage based on the input voltage Vin. For example, referring to FIG. 14, a voltage supplied by the power supply 1400 may include a driving voltage EVDD, a source voltage SVDD, a gate high voltage VGH, a gate low voltage VGL, a reference voltage Vref, and the like. The power supply 1400 may include a boost converter 1410, a buck converter 1420, a buck-boost converter 1430, and an operational amplifier 1440.

Referring to FIGS. 14 and 5, the feature of the power supply 1400 in which the driving voltage EVDD, the gate low voltage VGL, and the reference voltage Vref are supplied is in the same as that of the power supply 500 of FIG. 5.

Referring to FIG. 14, the power supply 1400 may supply the gate high voltage VGH based on the input voltage Vin. The input voltage Vin may be supplied to the boost converter 1410, and then, the boost converter 1410 may supply the gate high voltage VGH resulting from adjusting the input voltage Vin.

Referring to FIG. 14, the power supply 1400 may supply the source voltage SVDD based on the input voltage Vin. The input voltage Vin may be supplied to the boost converter 1410, and then, a voltage (e.g., the source voltage SVDD, the input voltage Vin passed by the boost converter 1410, or a voltage different from the source voltage SVDD and the input voltage Vin) output from the boost converter 1410 may be supplied to the buck converter 1420. The voltage output from the buck converter 1420 may be the source voltage SVDD.

The buck converter 1420 may be, for example, the source voltage generation circuit 600 shown in FIG. 6. In this implementation, the input voltage Vin supplied to the source voltage generation circuit 600 may be a voltage boosted by the boost converter 1410. The buck converter 1420 may receive a normal source voltage control signal C_PM1 and a variable source voltage control signal C_PM2.

For example, when the buck converter 1420 receives the normal source voltage control signal C_PM1, the buck converter 1420 may output a source voltage SVDD, which is the first source voltage SVDD_71.

For example, when the buck converter 1420 receives the variable source voltage control signal C_PM2, the buck converter 1420 may output a source voltage SVDD having a value or level less than the first source voltage SVDD_71. The buck converter 1420 may supply a source voltage SVDD having a value or level less than the input voltage Vin.

The buck converter 1420 may include a voltage controller electrically connected between an input node Nin and a shared node, an inductor electrically connected between the shared node and an output node Nout, and a diode electrically connected between the first shared node and a base voltage node. The gate node of a control transistor may be electrically connected to the voltage controller. The voltage controller may be electrically connected to a control node Nc and a feedback node Nfb. The buck converter 1420 may output a voltage in a non-inverting state when compared to the input voltage Vin. The buck converter 1420 may be a non-inverting buck converter.

As shown in FIG. 14, the power supply 1400 may generate a source voltage SVDD corresponding to the voltage range of the second reference source voltage SVDD_ref2 through the buck converter 1420, and then supply the generated source voltage SVDD. The second reference source voltage SVDD_ref2 may be a voltage having a value or level less than the input voltage Vin.

Figure 15:
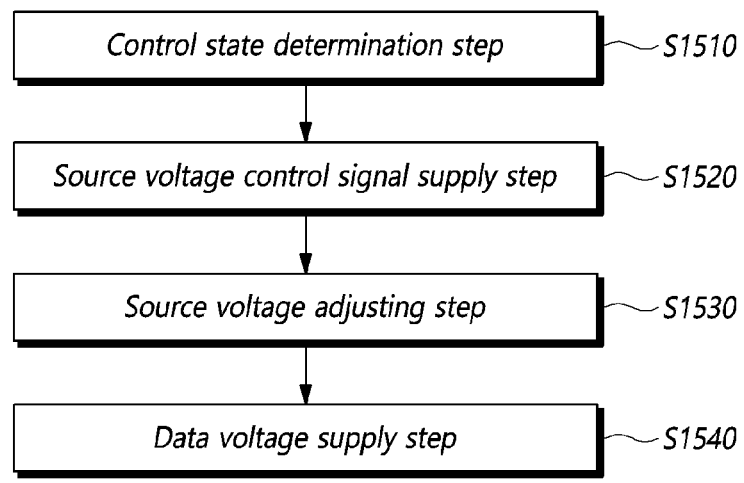
FIG. 15 illustrates, for controlling a source voltage, an example driving method of the display device according to aspects of the present disclosure.

FIG. 15 is a flowchart illustrating an example method of driving the display device 100 for controlling a source voltage SVDD according to aspects of the present disclosure.

The method of driving the display device 100 for controlling the source voltage SVDD may include: determining a control state, at step S1510; supplying a source voltage control signal, at step S1520; adjusting a source voltage, at step S1530; and supplying a data voltage, at step S1540.

In the control state determination step S1510, a state in which the display device 100 is being controlled may be determined.

During the control state determination step S1510, one of the compensation mode Mode_Comp, the eco mode Mode_Eco, and the real-time mode Mode_RT may be determined depending on the determined state in which the display device 100 is being controlled. For example, if it is determined that the display panel 110 has just been driven, the compensation mode Mode_Comp may be selected. If it is determined that setting of the maximum luminance of the display panel 110 has been changed, the eco mode Mode_Eco may be selected. If it is determined that normal image driving is being performed through the display panel 110, real-time mode Mode_RT may be selected.

In the source voltage control signal supply step S1520, a variable source voltage control signal C_PM2 may be supplied from the source voltage control circuit 141 to the source voltage generation circuit 600.

In the source voltage adjusting step S1530, a controlled variable source voltage SVDD_adap adjusted based on the variable source voltage control signal C_PM2 by the source voltage generation circuit 600 may be supplied to the data driving circuit 120.

In the data voltage supply step S1540, a data voltage Vdata may be supplied to the display panel 110 by the data driving circuit 120 using the variable source voltage SVDD_adap. The data voltage Vdata may be a data voltage Vdata to which compensation has been applied for uniformity in the luminance of the display panel 110.

Figure 16:
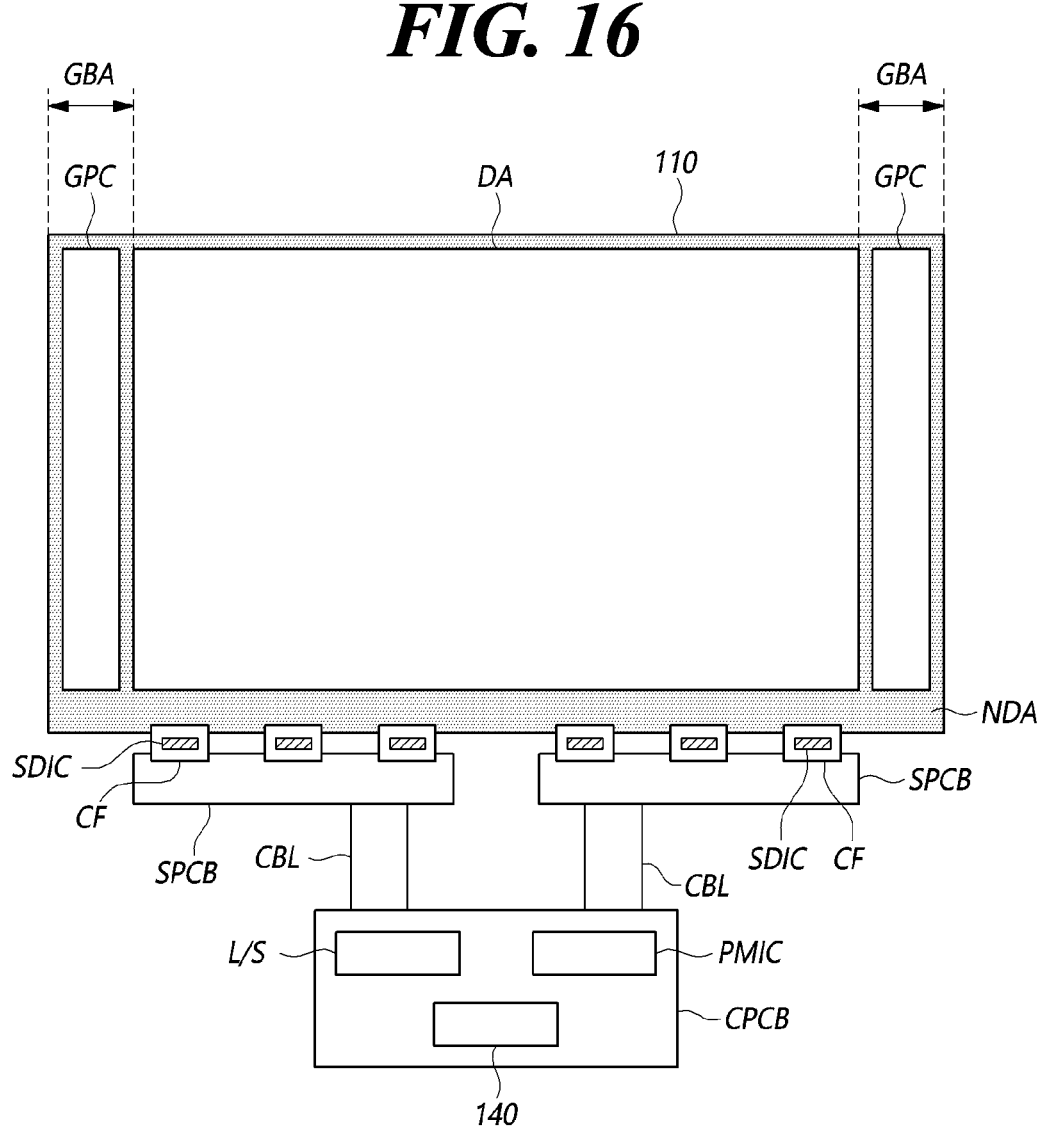
FIG. 16 illustrates an example system configuration of the display device according to aspects of the present disclosure.

FIG. 16 illustrates an example system configuration of the display device 100 according to aspects of the present disclosure.

Referring to FIG. 16, the display panel 110 may include a display area DA in which one or more images may be displayed and a non-display area NDA in which an image is not displayed.

In an aspect, a data driving circuit 120 (e.g., the data driving circuit 120 discussed above with reference to FIG. 1) may include a plurality of source driver integrated circuits SDIC and may be implemented using the chip-on-film (COF) technique. For example, each of the plurality of source driver integrated circuits SDIC may be mounted on a corresponding circuit film CF connected to the non-display area NDA of the display panel 110. In this example, the circuit film CF may be also referred to as a flexible printed circuit.

In an aspect, in the configuration of FIG. 16, one or more gate driving circuits 130 may be implemented using the gate-in-panel (GIP) technique. Hereinafter, the gate driving circuit 130 implemented using the gate-in-panel (GIP) technique may be also referred to as a gate driving panel circuit GPC.

One or more gate driving panel circuit GPC may be located in the non-display area NDA of the display panel 110. In an aspect, in the configuration of FIG. 16, one or more gate driving panel circuits GPC may be located in, and/or electrically connected to, but not limited to, one or more areas of the non-display area NDA of the display panel 110. For example, the one or more gate driving panel circuits GPC may be located in, and/or electrically connected to, only one side or portion (e.g., a left edge, a right edge, an upper edge, or a lower edge), or two sides or portions (e.g., a left edge and a right edge, or an upper edge and a lower edge) of the display panel 110. Hereinafter, two or more gate driving panel circuits GPC, which are gate driving circuits 130 configured using the GIP technique, may be disposed in the display panel 110 as shown in FIG. 16; however, for merely convenience of description, discussions related to the gate driving panel circuits GPC will be provided by restricting to one gate driving panel circuit GPC. It should be therefore understood that the scope of the present disclosure includes examples where the two or more gate driving panel circuits GPC are disposed in the display panel 110.

The display device 100 may include at least one source printed circuit board SPCB and a control printed circuit board CPCB for a circuital connection between the plurality of source driver integrated circuits SDIC and other devices or components (e.g., 140, L/S, PMIC, and the like).

At least one circuit film CF on which a corresponding source driver integrated circuit SDIC is mounted may be connected to any one of the at least one source printed circuit board SPCB. For example, a first side of each of the at least one circuit film CF on which a corresponding source driver integrated circuit SDIC is mounted may be electrically connected to the display panel 110, and a second opposing side thereof may be electrically connected to the source printed circuit board SPCB.

A controller 140 (e.g., the controller 140 discussed above with reference to FIG. 1) and a power management integrated circuit PMIC may be mounted on the control printed circuit board CPCB.

The controller 140 may perform an overall control function related to the driving of the display panel 110 and control operations of the plurality of source driver integrated circuits SDIC and the gate driving panel circuit GPC.

The power management integrated circuit PMIC may supply various types of voltages or currents to the plurality of source driver integrated circuits SDIC, the gate driving panel circuit GPC, and the like, or control the various types of voltages or currents to be supplied.

A circuital connection between the at least one source printed circuit board SPCB and the control printed circuit board CPCB may be performed through at least one connection cable CBL. For example, the connection cable CBL may be one of a flexible printed circuit (FPC) and a flexible flat cable (FFC).

In an aspect, the at least one source printed circuit board SPCB and the control printed circuit board CPCB may be integrated into one printed circuit board.

In an aspect, the display device 100 according to aspects of the present disclosure may further include a level shifter L/S for adjusting a voltage level of a signal. For example, the level shifter L/S may be disposed on the control printed circuit board CPCB or the at least one source printed circuit board SPCB.

In an aspect, in the display device 100 according to aspects of the present disclosure, the level shifter L/S may output signals needed for gate driving to the gate driving panel circuit GPC, which is the gate driving circuit 130 configured using the GIP technique.

For example, the power management integrated circuit PMIC may supply a signal to the level shifter L/S. The level shifter L/S may adjust a voltage level of the signal supplied by the power management integrated circuit PMIC. The signal whose voltage level has been adjusted by the level shifter L/S may be supplied to the gate driving panel circuit GPC.

For example, the level shifter L/S may supply a plurality of clock signals with different phases to the gate driving panel circuit GPC. The gate driving panel circuit GPC may generate a plurality of gate signals (e.g., at least one scan signal SC, at least one sensing signal SE, and the like) based on the plurality of clock signals supplied by the level shifter L/S, and output the generated gate signals to a plurality of gate lines (e.g., at least one scan signal line SCL, at least one sensing signal line SENL, and the like).

Referring to FIG. 16, the non-display area NDA of the display panel 110 may include one or more gate bezel areas GBA. Hereinafter, two or more gate bezel areas GBA may be disposed in the non-display area NDA as shown in FIG. 16; however, for merely convenience of description, discussions related to the gate bezel areas GBA will be provided by restricting to one gate bezel area GBA. It should be therefore understood that the scope of the present disclosure includes examples where the two or more gate bezel areas GBA GPC are disposed in the non-display area NDA. The gate bezel area GBZ may refer to an area where the gate driving panel circuit GPC, which is the gate driving circuit 130 configured using the GIP technique, and several types of lines connected to the gate driving panel circuit GPC are disposed.

Referring to FIG. 16, the several types of lines connected to the gate driving panel circuit GPC may include one or more clock lines, one or more high level gate voltage lines, and one or more low level gate voltage lines, and the like.

Hereinafter, discussions are provided on an example configuration of the gate driving panel circuit GPC and an example structure of the gate bezel area GBA where the gate driving panel circuit GPC is disposed in the display device 100 according to aspects of the present disclosure.

Figure 17:
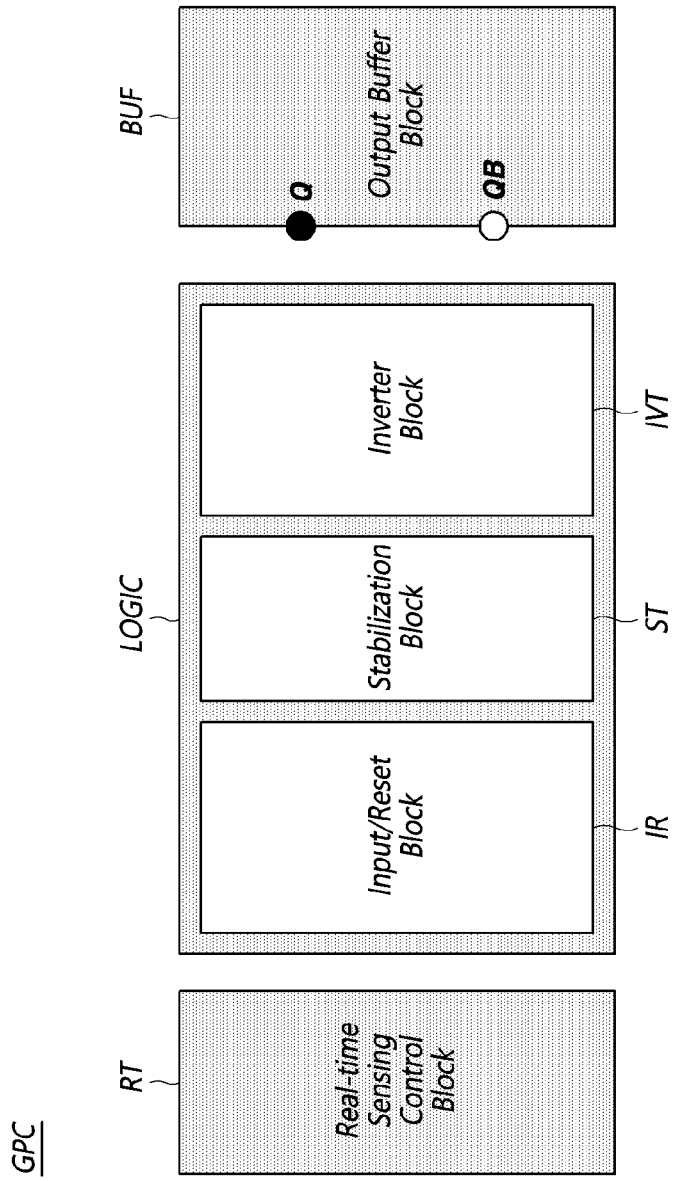
FIG. 17 illustrates an example configuration of a gate driving panel circuit included in the display device according to aspects of the present disclosure.

FIG. 17 illustrates an example configuration of a gate driving panel circuit GPC included in the display device 100 according to aspects of the present disclosure.

Referring to FIG. 17, a gate driving panel circuit GPC (e.g., the gate driving panel circuit GPC discussed above with reference to FIG. 16) may include an output buffer block BUF, a logic block LOGIC, and a real-time sensing control block RT.

Referring to FIG. 17, the output buffer block BUF may be configured to output two or more gate signals. For example, the output buffer block BUF included in the gate driving panel circuit GPC may output at least one scan signal SC and at least one sensing signal SE. In this example, subpixels SP included in the display device 100 may have a two-gate driven structure.

Referring to FIG. 17, the output buffer block BUF may be controlled depending on voltage values or voltage levels of a Q node and a QB node of the gate driving panel circuit GPC. The operation and output of the output buffer block BUF may vary depending on the voltage values or voltage levels of the Q node and QB node.

The Q node and QB node may have different voltage levels. For example, during a first period, when the voltage of the Q node is a high level voltage, the voltage of the QB node may be a low level voltage. During a second period before or after the first period, when the voltage of the Q node is a low level voltage, the voltage of the QB node may be a high level voltage.

Referring to FIG. 17, the logic block LOGIC may be a circuit block configured to control the operation of the output buffer block BUF and implement the operation of a shift register. The logic block LOGIC may control voltages of the Q node and QB node to control the operation of the output buffer block BUF.

Referring to FIG. 17, the logic block LOGIC may include an input and reset block IR, a stabilization block ST, an inverter block IVT, and the like.

The input and reset block IR may be a circuit block configured to control charging and discharging of the Q node. The inverter block IVT may be configured to control an electrical value (or level) of the Q node or the QB node such that a voltage level resulting from inverting a voltage level of the Q node becomes a voltage level of the QB node depending on a voltage of the Q node. The stabilization block ST may be configured to stabilize the Q node and an output depending on a voltage of the QB node during a period during which an output signal of the gate driving panel circuit GPC has a turn-off level voltage.

Each of the input and reset block IR, the stabilization block ST, and inverter block IVT may include at least one transistor.

The real-time sensing control block RT may be a circuit block configured to control the operation of the output buffer block BUF for real-time sensing driving. The real-time sensing driving may be a sensing driving performed in real time while the display is being driven, and be a sensing driving performed in each blank period BLANK between active periods ACT. The real-time sensing driving may proceed in a sensing mode corresponding to a fast sensing mode. The real-time sensing driving may be a sensing driving for sensing the mobility of a corresponding driving transistor DRT of each subpixel SP.

The real-time sensing control block RT may include at least one transistor.

The real-time sensing control block RT may be configured to control voltages of the Q node and the QB node so that the output buffer block BUF may output a scan signal SC and a sensing signal SE to a subpixel SP where real-time sensing driving is performed.

Figure 18:
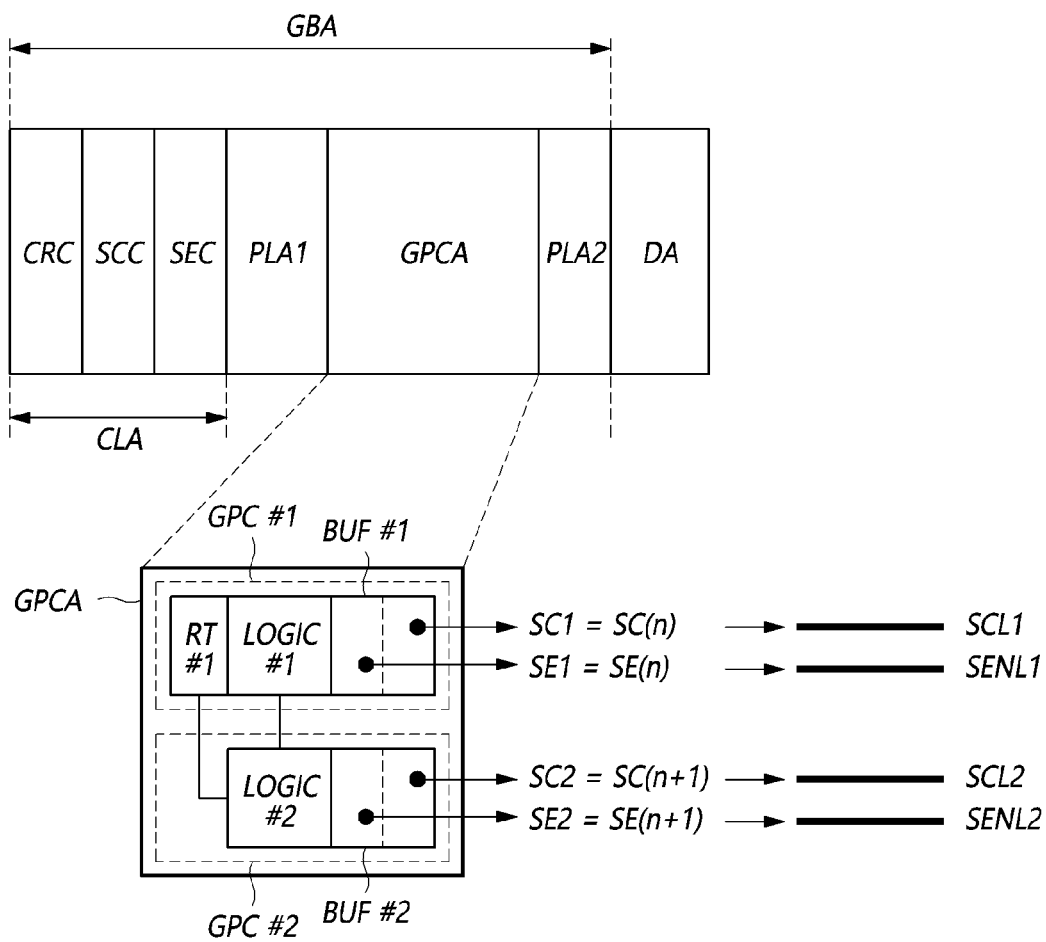
FIG. 18 illustrates an example configuration of a gate bezel area defined in the display panel according to aspects of the present disclosure.

FIG. 18 illustrates an example configuration of a gate bezel area GBA (e.g., the gate bezel area GBA discussed above with reference to FIG. 16) defined in the display panel 110 according to aspects of the present disclosure.

Referring to FIG. 18, in one or more aspects, the gate bezel area GBA of the display panel 110 may include a clock signal line area CLA, a first power line area PLA1, a gate driving panel circuit area GPCA, a second power line area PLA2, and the like.

The gate driving panel circuit area GPCA may be an area in which a gate driving panel circuit GPC (e.g., the gate driving panel circuit GPC discussed above with reference to FIGS. 16 and 17) is disposed. The gate driving panel circuit GPC may supply scan signals SC and sensing signals SE to be supplied to subpixels SP having a two-gate driven structure.

In an aspect, several types of lines for carrying power, voltage, and signals to the gate driving panel circuit GPC may be disposed around the gate driving panel circuit area GPCA. For example, the clock signal line area CLA, the first power line area PLA1, and the second power line area PLA2 may be disposed around the gate driving panel circuit area GPCA of the gate bezel area GBA.

For example, the clock signal line area CLA and the first power line area PLA1 may be located a first side of the gate driving panel circuit area GPCA, and the second power line area PLA2 may be located a second opposing side of the gate driving panel circuit area GPCA.

For example, the gate driving panel circuit area GPCA may be located on a first side of the second power line area PLA2, and the display area DA may be located on a second opposing side of the second power line area PLA2.

The clock signal line area CLA may be an area in which clock signal lines are disposed for delivering several types of clock signals to the gate driving panel circuit GPC.

The first power line area PLA1 may be an area in which at least one gate high voltage line is disposed for delivering at least one gate high voltage to the gate driving panel circuit GPC.

In an aspect, at least one control signal line for delivering at least one control signal to the gate driving panel circuit GPC may be further disposed in the first power line area PLA1. For example, the at least one control signal may include at least one of a start signal, a reset signal, and a line selection signal.

The second power line area PLA2 may be an area in which at least one gate low voltage line is disposed for delivering at least one gate low voltage to the gate driving panel circuit GPC.

Referring to FIG. 18, in an aspect, the clock signal line area CLA may include a carry clock signal line area CRC, a scan clock signal line area SCC, and a sensing clock signal line area SEC.

The carry clock signal line area CRC may be an area in which carry clock signal lines are disposed for delivering carry clock signals to the gate driving panel circuit GPC.

The scan clock signal line area SCC may be an area in which scan clock signal lines are disposed for delivering scan clock signals to the gate driving panel circuit GPC.

The sensing clock signal line area SEC may be an area in which sensing clock signal lines are disposed for delivering sensing clock signals to the gate driving panel circuit GPC.

An order in which the carry clock signal line area CRC, the scan clock signal line area SCC, and the sensing clock signal line area SEC are located may be set in various orders (e.g., CRC-SCC-SEC, SCC-CRC-SEC, SCC-SEC-CRC, SEC-SCC-CRC, or the like).

For example, among the carry clock signal line area CRC, the scan clock signal line area SCC, and the sensing clock signal line area SEC, the scan clock signal line area SCC may be located between the carry clock signal line area CRC and the sensing clock signal line area SEC, and the carry clock signal line area CRC may be further away from the display area DA or the gate driving panel circuit area GPCA than the sensing clock signal line area SEC.

Referring to FIG. 18, the gate driving panel circuit GPC disposed in the gate driving panel circuit area GPCA may include a first gate driving panel circuit GPC #1 and a second gate driving panel circuit GPC #2. Each of the first gate driving panel circuit GPC #1 and the second gate driving panel circuit GPC #2 may have a separate Q node and a separate QB node.

The first gate driving panel circuit GPC #1 may include a first output buffer block BUF #1, a first logic block LOGIC #1, and a first real-time sensing control block RT #1.

The first output buffer block BUF #1 may be configured to output a first scan signal SC1 and a first sensing signal SE1 respectively to a first scan signal line SCL1 and a first sensing signal line SENL1 connected to a first subpixel SP. For example, the first scan signal SC1 may be an nth scan signal SC(n), and the first sensing signal SE1 may be an nth sensing signal SE(n).

The first logic block LOGIC #1 may be configured to control operation of the first output buffer block BUF #1 by controlling respective voltages of a corresponding Q node and a corresponding QB node.

The second gate driving panel circuit GPC #2 may include only a second output buffer block BUF #2 and a second logic block LOGIC #2.

The second output buffer block (BUF #2) may be configured to output a second scan signal SC2 and a second sensing signal SE2 respectively to a second scan signal line SCL2 and a second sensing signal line SENL2 connected to a second subpixel SP. For example, the second scan signal SC2 may be an (n+1)th scan signal SC(n+1), and the second sensing signal SE2 may be an (n+1)th sensing signal SE(n+1).

The second logic block LOGIC #2 may be configured to control operation of the second output buffer block BUF #2 by controlling respective voltages of a corresponding Q node and a corresponding QB node.

The first real-time sensing control block RT #1 may be shared by the first gate driving panel circuit GPC #1 and the second gate driving panel circuit GPC #2. Accordingly, the size of the gate bezel area GBA may be significantly reduced.

The first real-time sensing control block RT #1 may be configured to control operation of the first output buffer block BUF #1 so that the first output buffer block BUF #1 outputs the first scan signal SC1 and the first sensing signal SE1 for sensing driving to the first subpixel SP where real-time sensing driving will be performed by controlling respective voltages of the Q node and QB node of the first gate driving panel circuit GPC #1 during a first real-time sensing driving period (a first blank period).

The first real-time sensing control block RT #1 may be configured to control operation of the second output buffer block BUF #2 so that the second output buffer block BUF #2 outputs the second scan signal SC2 and the second sensing signal SE2 for sensing driving to the second subpixel SP where real-time sensing driving will be performed by controlling respective voltages of the Q node and QB node of the second gate driving panel circuit GPC #2 during a second real-time sensing driving period (a second blank period), which is different from the first real-time sensing driving period (the first blank period).

At least one specific node of the first logic block LOGIC #1 and at least one specific node of the second logic block LOGIC #2 may be electrically connected to each other.

Referring to FIG. 18, among the first output buffer block BUF #1, the first logic block LOGIC #1, and the first real-time sensing control block RT #1, the first real-time sensing control block RT #1 may be furthest away from the display area DA.

Referring to FIG. 18, the gate driving panel circuit area GPCA may be disposed between the first power line area PLA1 and the second power line area PLA2.

Accordingly, at least one gate high voltage line disposed in the first power line area PLA1 and at least one gate low voltage line disposed in the second power line area PLA2 may be separated by the gate driving panel circuit GPC disposed in the gate driving panel circuit area GPCA.

According to the configuration of the power-related lines and areas discussed above, since at least one high voltage line and at least one low voltage line do not overlap with each other, one or more high voltages and one or more low voltages may be stabilized or stably supplied.

Figure 19:
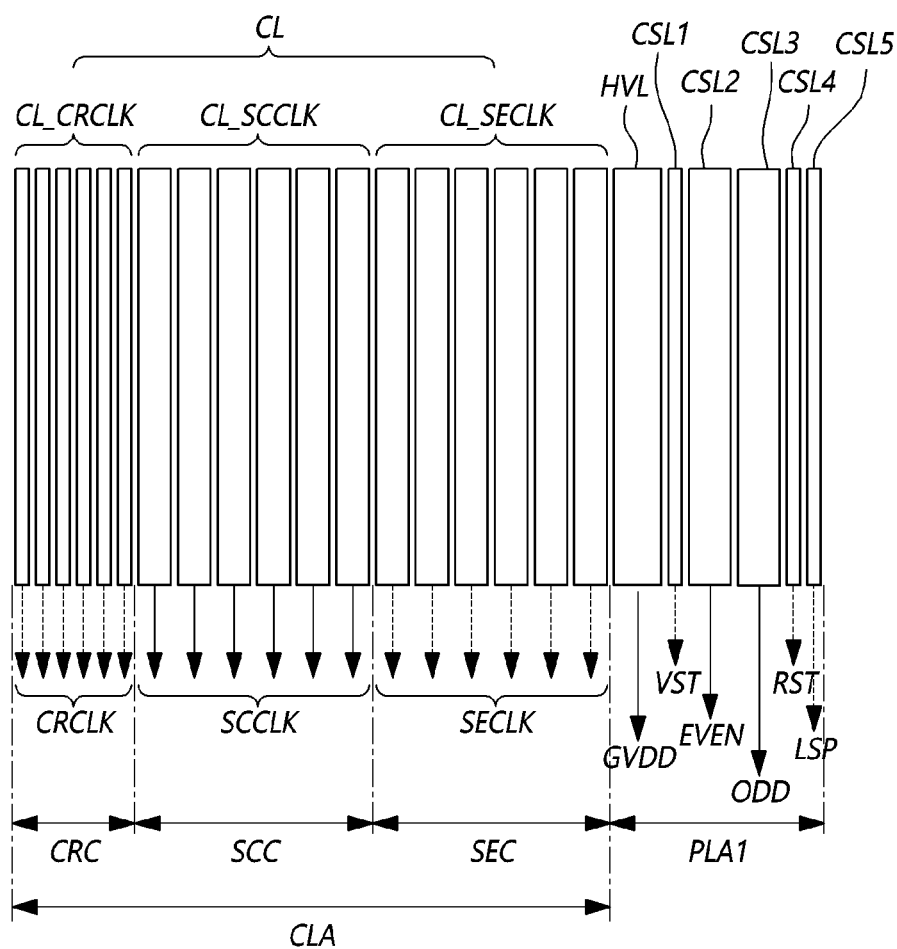
FIG. 19 illustrates, an example line arrangement in a clock signal line area and a first power line area defined in the gate bezel area of a non-display area of the display panel according to aspects of the present disclosure.

FIG. 19 illustrates, an example line arrangement in a clock signal line area CLA (e.g., the clock signal line area discussed above with reference to FIG. 18) and a first power line area PLA1 (e.g., the first power line area PLA1 discussed above with reference to FIG. 18) defined in the gate bezel area GBA of the non-display area NDA of the display panel 110 according to aspects of the present disclosure.

Referring to FIG. 19, a gate bezel area GBA (e.g., the gate bezel area GBA discussed above with reference to FIGS. 16 and 18) of the display panel 110 may include the clock signal line area CLA and the first power line area PLA1. The clock signal line area CLA and the first power line area PLA1 may be located on one side of the gate driving panel circuit area GPCA.

Referring to FIG. 19, the clock signal line area CLA in which a plurality of clock signal lines CL are disposed may include a carry clock signal line area CRC, a scan clock signal line area SCC, and a sensing clock signal line area SEC.

Carry clock signal lines CL_CRCLK for delivering carry clock signals CRCLK to the gate driving panel circuit GPC may be disposed in the carry clock signal line area CRC.

Scan clock signal lines CL_SCCLK for delivering scan clock signals SCCLK to the gate driving panel circuit GPC may be disposed in the scan clock signal line area SCC.

Sensing clock signal lines CL_SECLK for delivering sensing clock signals SECLK to the gate driving panel circuit GPC may be disposed in the sensing clock signal line area SEC.

Among the carry clock signal line area CRC, the scan clock signal line area SCC, and the sensing clock signal line area SEC, the scan clock signal line area SCC may be located between the carry clock signal line area CRC and the sensing clock signal line area SEC, the carry clock signal line area CRC may be located furthest away from the display area DA, and the sensing clock signal line area SEC may be located closest to the display area DA.

Among the carry clock signal line area CRC, the scan clock signal line area SCC, and the sensing clock signal line area SEC, the carry clock signal line area CRC may be located furthest away from the gate driving panel circuit area GPCA, and the sensing clock signal line area SEC may be located closest to the gate driving panel circuit area GPCA.

Referring to FIG. 19, in an aspect, a width of one scan clock signal line CL_SCCLK may be greater than that of one carry clock signal line CL_CRCLK. In an aspect, a width of one sensing clock signal line CL_SECLK may be greater than that of one carry clock signal line CL_CRCLK.

Referring to FIG. 19, at least one gate high voltage line HVL for delivering at least one gate high voltage GVDD to the gate driving panel circuit GPC may be disposed in the first power line area PLA1.

Referring to FIG. 19, at least one control signal line may be further disposed in the first power line area PLA1. For example, at least one control signal line may include at least one of a start signal line CSL1 for delivering a start signal VST for indicating the start of gate driving operation to the gate driving panel circuit GPC, a first driving sequence control signal line CSL2 for delivering an even-numbered driving control signal EVEN to the gate driving panel circuit GPC, a second driving sequence control signal line CSL3 for delivering an odd-numbered driving control signal ODD to the gate driving panel circuit GPC, a reset signal line CSL4 for delivering a reset signal RST for indicating the end of the gate driving operation to the gate driving panel circuit GPC, and a line selection signal line CSL5 for delivering a line selection signal LSP to the gate driving panel circuit GPC.

The gate high voltage line HVL may have a greater width than the start signal line CSL1, the reset signal line CSL4), and the line select signal line CSL5.

For example, the first driving sequence control signal line CSL2 and the second driving sequence control signal line CSL3 may be disposed in two specific line areas in the first power line area PLA1. In another example, two gate high voltage lines, instead of the first driving sequence control signal line CSL2 and the second driving sequence control signal line CSL3, may be disposed in the two specific line areas in the first power line area PLA1.

Figure 20:
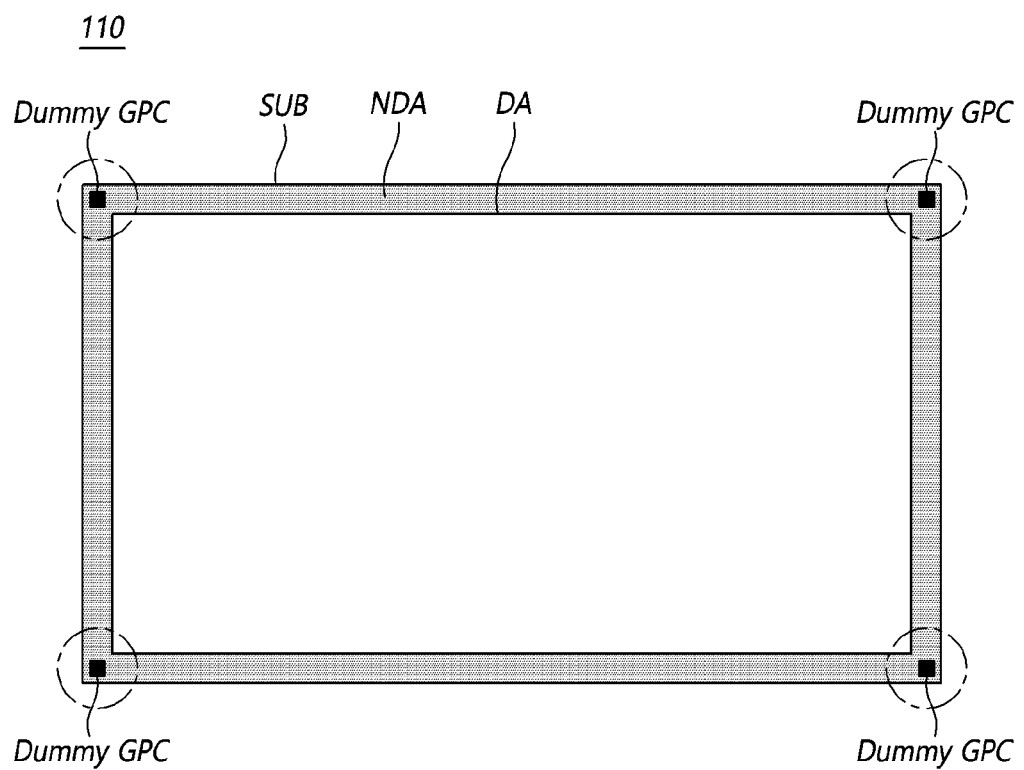
FIG. 20 is an example plan view of the display panel according to aspects of the present disclosure, and illustrates one or more exemplary dummy gate driving panel circuits disposed in one or more corner areas of the display panel (e.g., upper-left, upper-right, lower-left, and/or lower-rights corners)

FIG. 20 is an example plan view of the display panel 100 according to aspects of the present disclosure, and illustrates one or more example dummy gate driving panel circuits (Dummy GPC) disposed in one or more corner areas of the display panel 110 (e.g., upper-left, upper-right, lower-left, and/or lower-rights corners).

Referring to FIG. 20, in one or more aspects, the display panel 110 according to aspects of the present disclosure may include one or more dummy gate driving panel circuits (Dummy GPC) disposed at all, or one or more, of a plurality of corner areas (or corner points) of the non-display area DNA.

The dummy gate driving panel circuit (Dummy GPC) may have basically the same structure as the gate driving panel circuit GPC. However, the dummy gate driving panel circuit (Dummy GPC) may not be connected to a gate line GL actually used to drive the display. For example, such a gate line GL may be a scan signal line SCL or a sensing signal line SENL.

Figure 21:
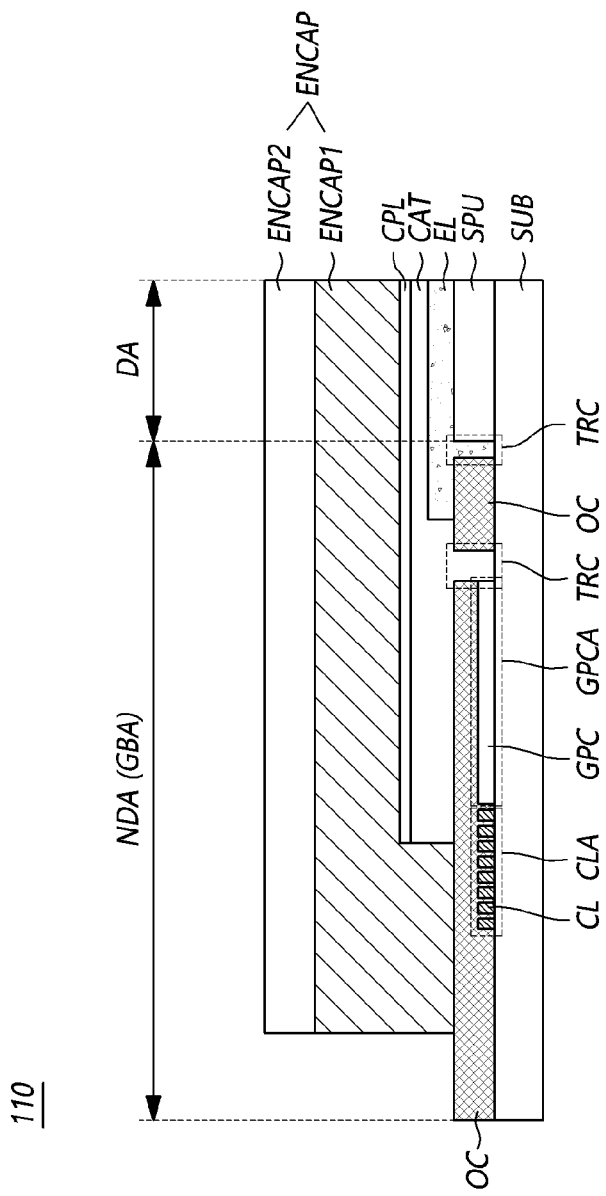
FIG. 21 is an example cross-sectional view of the display panel according to aspects of the present disclosure, and illustrates an area including respective portions of the gate bezel area and a display area.

FIG. 21 is an example cross-sectional view of the display panel 110 according to aspects of the present disclosure, and illustrates an area including respective portions of a gate bezel area GBA (e.g., the gate bezel area GBA discussed above with reference to FIGS. 16 to 20) and the display area DA.

The cross-sectional view of FIG. 21 represents an area including the gate bezel area GBA where a gate driving panel circuit GPC (e.g., the gate driving panel circuit GPC discussed above with reference to FIGS. 16 to 20) is disposed and a portion of the display area DA adjacent to the gate bezel area GBA in the non-display area NDA of the display panel 110.

Referring to FIG. 21, in one or more aspects, the display panel 110 according to aspects of the present disclosure may include a substrate SUB, the gate driving panel circuit GPC, a plurality of clock signal lines CL, an overcoat layer OC, a cathode electrode CAT, and the like.

The display area DA and the non-display area NDA may be defined on the substrate SUB.

The gate driving panel circuit GPC may be disposed on the substrate SUB. For example, the gate driving panel circuit GPC may be disposed in a gate driving panel circuit area GPCA of the gate bezel area GBA in the non-display area NDA, and be configured to output a corresponding gate signal to each of a plurality of gate lines GL disposed in the display area DA.

For example, the plurality of gate lines GL may include a plurality of scan signal lines SCL and a plurality of sensing signal lines SENL.

The plurality of clock signal lines CL may be disposed on the substrate SUB. For example, the plurality of clock signal lines CL may be disposed in a clock signal line area CLA located on one side of the gate driving panel circuit area GPCA in the non-display area NDA. Each of the plurality of clock signal lines CL may deliver a corresponding clock signal to the gate driving panel circuit GPC.

For example, the clock signal line area CLA may be further away from the display area DA than the gate driving panel circuit area GPCA. For example, the clock signal line area CLA may be located in a further outer edge of the substrate SUB than the gate driving panel circuit area GPCA.

For example, the plurality of clock signal lines CL may include a plurality of carry clock signal lines CL_CRCLK, a plurality of scan clock signal lines CL_SCCLK, and a plurality of sensing clock signal lines CL_SECLK.

The overcoat layer OC may be disposed on the plurality of clock signal lines CL.

The overcoat layer OC may be disposed on the gate driving panel circuit GPC.

The cathode electrode CAT is disposed in the display area DA and may extend to the non-display area NDA.

The cathode electrode CAT may extend to the gate bezel area GBA of the non-display area NDA. For example, the cathode electrode CAT may extend to all or at least a portion of the gate driving panel circuit GPC such that the cathode electrode CAT is located on (or covers) all or at least a portion of the gate driving panel circuit GPC. According to this configuration, the cathode electrode CAT may overlap with all or at least a portion of the gate driving panel circuit GPC.

The cathode electrode CAT may extend to the gate bezel area GBA of the non-display area NDA. For example, the cathode electrode CAT may extend to all, or one or more, of the plurality of clock signal lines CL such that the cathode electrode CAT is located on (or covers) all, or one or more, of the plurality of clock signal lines CL. According to this configuration, the cathode electrode CAT may overlap all, or one or more, of the plurality of clock signal lines CL.

A first power line area PLA1 (e.g., the first power line area PLA1 discussed above with reference to FIGS. 18 and 19) may be disposed between the clock signal line area CLA and the gate driving panel circuit area GPCA, and a second power line area PLA2 (e.g., the second power line area PLA2 discussed above with reference to FIGS. 18 and 19) may be disposed between the gate driving panel circuit area GPCA and the display area DA. It should be noted that, in FIG. 21, the first power line area PLA1 and the second power line area PLA2 are omitted.

Referring to FIG. 21, an emission layer EL located under the cathode electrode CAT may be disposed in the display area DA and, for example, extend to a portion of the non-display area NDA. The emission layer EL may overlap with a portion of the overcoat layer OC.

A subpixel section SPU may be located under the emission layer EL. The subpixel section SPU may include an anode electrode AE, transistors (DRT, SCT, SENT, and the like), a storage capacitor Cst, and the like.

Referring to FIG. 21, one or more trenches TRC, which may be holes formed in the overcoat layer OC or areas in which corresponding portions of the overcoat layer OC are removed, may be present in the non-display area NDA. For example, when a plurality of trenches TRC are present, one of the plurality of trenches TRC may not overlap with the emission layer EL, and the other or another thereof may overlap with the emission layer EL. The emission layer EL may extend to the non-display area NDA and be inserted into the one or more trenches TRC of the overcoat layer OC.

Referring to FIG. 21, one or more aspects, the display panel 110 according to aspects of the present disclosure may include a capping layer CPL disposed on the cathode electrode CAT and an encapsulation layer ENCAP disposed on the capping layer CPL.

The encapsulation layer ENCAP may include a first encapsulation layer ENCAP1 and a second encapsulation layer ENCAP2. For example, the first encapsulation layer ENCAP1 may include an adhesive and/or a moisture absorbent having an encapsulation function. The first encapsulation layer ENCAP1 may include an organic material. The second encapsulation layer ENCAP2 may include a metal or an inorganic material. The second encapsulation layer ENCAP2 may be disposed such that the second encapsulation layer ENCAP2 covers the cathode electrode CAT, the capping layer CPL, and the first encapsulation layer ENCAP1.

The encapsulation layer ENCAP may overlap with the plurality of clock signal lines CL and the gate driving panel circuit GPC.

Each of the emission layer EL, the cathode electrode CAT, and the capping layer CPL may have a slightly different size or edge position from each other depending on process errors while the process of manufacturing the display panel 110 is performed. For example, the cathode electrode CAT may not overlap with all of the plurality of clock signal lines CL disposed in the clock signal line area CLA. Depending on the process errors, a portion of the cathode electrode CAT may overlap with all or one or more of the plurality of clock signal lines CL disposed in the clock signal line area CLA.

Figure 22:
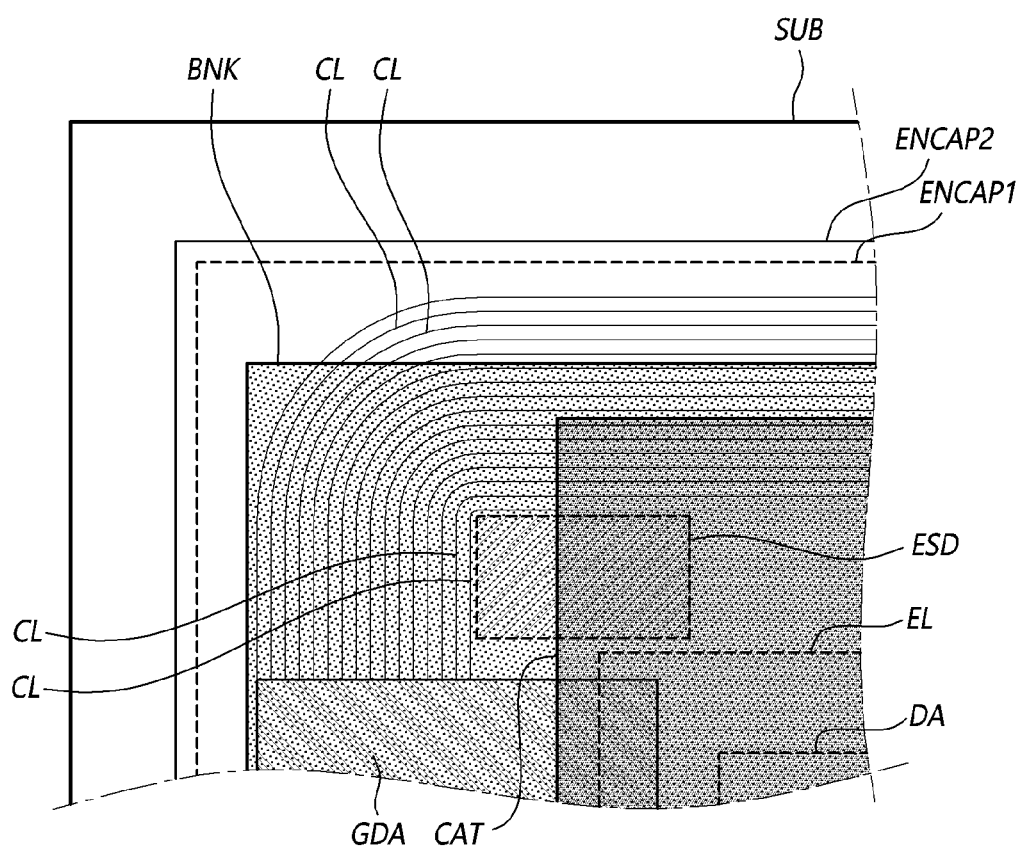
FIG. 22 is a plan view illustrating an example outer corner area of a substrate of the display panel according to aspects of the present disclosure.

FIG. 22 is a plan view illustrating an example outer corner area of the substrate SUB of the display panel 110 according to aspects of the present disclosure.

Referring to FIG. 22, in one or more aspects, the display panel 110 according to aspects of the present disclosure may include a bank BNK extending from the display area DA to the non-display area NDA, an emission layer EL (e.g., the emission layer EL discussed above with reference to FIG. 21) extending from the display area DA to the non-display area NDA, a cathode electrode CAT (e.g., the cathode electrode CAT discussed above with reference to FIG. 21) extending from the display area DA to the non-display area NDA and located on the emission layer EL, and an electrostatic discharge component ESD disposed in an outer corner area of the non-display area NDA.

Referring to FIG. 22, in one or more aspects, a corner portion of bank BNK, a corner portion of cathode electrode CAT, a corner portion of a first encapsulation layer ENCAP1 (e.g., the first encapsulation layer ENCAP1 discussed above with reference to FIG. 21), and a corner portion of a second encapsulation layer ENCAP2 (e.g., the second encapsulation layer ENCAP2 discussed above with reference to FIG. 21) may be located in an outer corner area of the substrate SUB of the display panel 110.

Referring to FIG. 22, in the outer corner area of the display panel 110, among the bank BNK, the cathode electrode CAT, the first encapsulation layer ENCAP1, and the second encapsulation layer ENCAP2, the bank (BNK) may extend further outwardly than the cathode electrode CAT, and the first encapsulation layer ENCAP1 and the second encapsulation layer ENCAP2 may extend further outwardly than the bank BNK. The second encapsulation layer ENCAP2 may extend to a location the same as, or similar to, a location to which the first encapsulation layer ENCAP1 extends, or may extend further outwardly than the first encapsulation layer ENCAP1.

Referring to FIG. 22, a portion of a gate driving area GDA may be disposed in the outer corner area of the substrate SUB of the display panel 110.

Referring to FIG. 22, the gate driving area GDA may include the gate driving panel circuit area GPCA in which the gate driving panel circuit GPC is disposed. The gate driving area GDA may further include the clock signal line area CLA, the first power line area PLA1, and the second power line area PLA2.

Referring to FIG. 22, the gate driving area GDA may overlap with the bank BNK, the first encapsulation layer ENCAP1, and the second encapsulation layer ENCAP2. All or a portion of the gate driving area GDA may overlap with the cathode electrode CAT.

Referring to FIG. 22, the electrostatic discharge component ESD may be disposed in the outer corner area of the substrate SUB of the display panel 110. For example, the electrostatic discharge component ESD may include an electrostatic discharge circuit or an electrostatic discharge pattern.

A location at which the electrostatic discharge component ESD is disposed is not limited thereto. For example, one or more electrostatic discharge components ESD may be further disposed one or more location of the display device 100.

Referring to FIG. 22, the electrostatic discharge component ESD may overlap with the bank BNK. All or a portion of the electrostatic discharge component ESD may overlap with the cathode electrode CAT. The electrostatic discharge component ESD may overlap with the first encapsulation layer ENCAP1 and the second encapsulation layer ENCAP2, For example, the bank BNK may be disposed on the entire top surface, or overall, of the electrostatic discharge component ESD. The cathode electrode CAT may be disposed on the top surface of, or over, a portion of the electrostatic discharge component ESD.

Referring to FIG. 22, the plurality of clock signal lines CL may be disposed along the outer corner of the substrate SUB and/or edges adjacent to the outer corner of the substrate SUB.

Referring to FIG. 22, the plurality of clock signal lines CL may overlap with the first encapsulation layer ENCAP1 and the second encapsulation layer ENCAP2. All, or one or more, of the plurality of clock signal lines CL may overlap with the cathode electrode CAT. All, or one or more, of the plurality of clock signal lines CL may not overlap with the electrostatic discharge component ESD.

Referring to FIG. 22, the emission layer EL may be disposed to extend from the display area DA to the non-display area NDA. For example, the emission layer EL may be one of components for composing one of an organic light emitting diode (OLED), a quantum dot organic light emitting diode (QD-OLED), and a light emitting diode chip (LED chip).

Referring to FIG. 22, a portion of the gate driving area GDA may overlap with the emission layer EL. The electrostatic discharge component ESD may not overlap with the emission layer EL. In one or more aspects, the electrostatic discharge component ESD may overlap with all or a portion of the emission layer EL.

As described above, power consumption of the display device 100 may be reduced by using the variable source voltage SVDD_adap.

According to the aspects described herein, the display device 100 capable of allowing a source voltage to have variable voltage values (or variable voltage levels), and the method of driving the display device may be provided.

According to the aspects described herein, the display device capable of being driven at low power, and the method of driving the display device may be provided.

The aspects described above will be briefly described as follows.

According to the aspects described herein, a display device may be provided that includes a display panel in which a plurality of subpixels are disposed, a data driving circuit configured to supply a data voltage to the display panel, a controller for controlling the data driving circuit, and a power supply for supplying a variable source voltage generated based on an input voltage to the data driving circuit. The power supply may include a source voltage generation circuit configured to receive a variable source voltage control signal from the controller and output a variable source voltage corresponding to the variable source voltage control signal.

A value or level of the variable source voltage may increase after the display panel is driven.

A value or level of the variable source voltage may be adjusted depending on a maximum luminance setting of the display panel.

A value or level of the variable source voltage may be adjusted based on an image frame displayed through the display panel.

A value or level of the variable source voltage during an active period during which the data voltage is supplied to the display panel may be less than a value or level of the variable source voltage during a blank period, which is a period different from the active period.

The variable source voltage may be supplied to an output buffer included in the data driving circuit, and the output buffer may output the data voltage.

The source voltage generation circuit may be a boost converter, and the boost converter may output the variable source voltage greater than a reference source voltage.

The source voltage generation circuit may be a single ended primary inductor converter ("SEPIC circuit"), and the SEPIC circuit may output the variable source voltage less than the reference source voltage.

The source voltage generation circuit may be a buck-boost converter, and the buck-boost converter may output the variable source voltage less than the reference source voltage.

A voltage controller included in the source voltage generation circuit may include a non-volatile memory configured to receive and store the variable source voltage control signal, a register configured to receive the variable source voltage control signal from the non-volatile memory, and an analog-to-digital converter configured to receive the variable source voltage control signal from the register and convert the received variable source voltage control signal into an analog voltage.

The source voltage generation circuit may receive a normal source voltage control signal and supply a constant source voltage based on the normal source voltage control signal.

The variable source voltage may be fed back to the source voltage generation circuit.

According to the aspects described herein, a method of driving a display device (e.g., the display device 100) may be provided that includes: with a controller controlling a data driving circuit, supplying a variable source voltage control signal to a source voltage generation circuit included in a power supply; with the source voltage generation circuit, outputting a variable source voltage corresponding to the variable source voltage control signal to the data driving circuit; and with the data driving circuit, supplying a data voltage using the variable source voltage to a display panel.

A value or level of the variable source voltage may increase after the display panel is driven.

A value or level of the variable source voltage may be adjusted depending on a maximum luminance setting of the display panel.

A value or level of the variable source voltage may be adjusted based on an image frame displayed through the display panel.

A value or level of the variable source voltage during an active period during which the data voltage is supplied to the display panel may be less than a value or level of the variable source voltage during a blank period, which is a period different from the active period.

The source voltage generation circuit may be a boost converter, and the boost converter may output a variable source voltage greater than a reference source voltage.

The source voltage generation circuit may be a SEPIC circuit, and the SEPIC circuit may output a variable source voltage less than the reference source voltage.

The source voltage generation circuit may be a buck-boost converter, and the buck-boost converter may output a variable source voltage less than the reference source voltage.

The above description has been presented to enable any person skilled in the art to make, use and practice the technical features of the present disclosure, and has been provided in the context of a particular application and its requirements as examples. Various modifications, additions and substitutions to the described aspects will be readily apparent to those skilled in the art, and the principles described herein may be applied to other aspects and applications without departing from the scope of the present disclosure. The above description and the accompanying drawings provide examples of the technical features of the present disclosure for illustrative purposes only. That is, the disclosed aspects are intended to illustrate the scope of the technical features of the present disclosure.

It will be apparent to those skilled in the art that various modifications and variations can be made in the display device and the method of driving the display device of the present disclosure without departing from the spirit or scope of the aspects of the present disclosure. Thus, it is intended that the present disclosure covers the modifications and variations of the aspects provided they come within the scope of the appended claims and their equivalents.

What is claimed is:

1. A display device comprising:
    a display panel in which a plurality of subpixels are disposed;
    a data driving circuit configured to supply a data voltage to the display panel;
    a controller configured to control the data driving circuit; and
    a power supply configured to supply a variable source voltage generated based on an input voltage to the data driving circuit,
    wherein the power supply comprises a source voltage generation circuit configured to receive a variable source voltage control signal from the controller and output the variable source voltage corresponding to the variable source voltage control signal, and
    wherein a value or a level of the variable source voltage is adjusted depending on a maximum luminance setting of the display panel.

2. The display device of claim 1, wherein a value or a level of the variable source voltage increases after the display panel is driven.

3. The display device of claim 1, wherein a value or a level of the variable source voltage is adjusted based on an image frame displayed through the display panel.

4. The display device of claim 1, wherein a value or a level of the variable source voltage during an active period during which the data voltages is supplied to the display panel is less than a value or a level of the variable source voltage during a blank period, which is a period different from the active period.

5. The display device of claim 1, wherein the variable source voltage is supplied to an output buffer included in the data driving circuit, and the output buffer is configured to output the data voltage.

6. The display device of claim 1, wherein the source voltage generation circuit includes a boost converter, and the boost converter is configured to output the variable source voltage greater than a reference source voltage.

7. The display device of claim 1, wherein the source voltage generation circuit is a single ended primary inductor converter, and the single ended primary inductor converter is configured to output the variable source voltage less than a reference source voltage.

8. The display device of claim 1, wherein the source voltage generation circuit is a buck-boost converter, and the buck-boost converter is configured to output the variable source voltage less than a reference source voltage.

9. The display device of claim 1, wherein the source voltage generation circuit comprises a voltage controller including:
 a non-volatile memory configured to receive and store the variable source voltage control signal;
 a register configured to receive the variable source voltage control signal from the non-volatile memory; and
 a digital-to-analog converter configured to receive the variable source voltage control signal from the register and convert the received variable source voltage control signal into an analog voltage.

10. The display device of claim 1, wherein the source voltage generation circuit is configured to receive a normal source voltage control signal and supply a constant source voltage based on the normal source voltage control signal.

11. The display device of claim 1, wherein the variable source voltage is fed back to the source voltage generation circuit.

12. A method of driving a display device, the method comprising:
 with a controller controlling a data driving circuit, supplying a variable source voltage control signal to a source voltage generation circuit included in a power supply;
 with the source voltage generation circuit, outputting a variable source voltage corresponding to the variable source voltage control signal to the data driving circuit; and
 with the data driving circuit, supplying a data voltage using the variable source voltage to a display panel of the display device,
 wherein a value or a level of the variable source voltage is adjusted depending on a maximum luminance setting of the display panel.

13. The method of claim 12, wherein a value or a level of the variable source voltage increases after the display panel is driven.

14. The method of claim 12, wherein a value or a level of the variable source voltage is adjusted based on an image frame displayed through the display panel.

15. The method of claim 12, wherein a value or a level of the variable source voltage during an active period during which the data voltages is supplied to the display panel is less than a value or level of the variable source voltage during a blank period, which is a period different from the active period.

16. The method of claim 12, wherein the source voltage generation circuit is a boost converter, and the boost converter is configured to output the variable source voltage greater than a reference source voltage.

17. The method of claim 12, wherein the source voltage generation circuit is a single ended primary inductor converter, and the single ended primary inductor converter is configured to output the variable source voltage less than a reference source voltage.

18. The method of claim 12, wherein the source voltage generation circuit is a buck-boost converter, and the buck-boost converter is configured to output the variable source voltage less than a reference source voltage.

* * * * *